US007685501B2

(12) United States Patent
Ito

(10) Patent No.: US 7,685,501 B2
(45) Date of Patent: Mar. 23, 2010

(54) WIRELESS COMMUNICATION SYSTEM, RECEIVING APPARATUS WITH A PLURALITY OF ANTENNAS, DEMODULATING METHOD FOR SUCH WIRELESS COMMUNICATION SYSTEM, RECEIVING APPARATUS, AND PROGRAM FOR SUCH DEMODULATING METHOD

(75) Inventor: Takumi Ito, Tokyo (JP)

(73) Assignee: NEC Corporation, Tokyo (JP)

( * ) Notice: Subject to any disclaimer, the term of this patent is extended or adjusted under 35 U.S.C. 154(b) by 938 days.

(21) Appl. No.: 11/476,146

(22) Filed: Jun. 28, 2006

(65) Prior Publication Data

US 2007/0009057 A1    Jan. 11, 2007

(30) Foreign Application Priority Data

Jul. 8, 2005    (JP)    ............................. 2005-200213

(51) Int. Cl.
*H03M 13/00* (2006.01)
(52) U.S. Cl. ...................................................... 714/780
(58) Field of Classification Search ................. 714/780, 714/795–796; 375/262, 341
See application file for complete search history.

(56) References Cited

U.S. PATENT DOCUMENTS

2003/0131305 A1    7/2003    Taguchi et al.

2006/0269006 A1*    11/2006    Kuroda ........................ 375/260
2008/0095257 A1*    4/2008    Maeda et al. ................ 375/262

FOREIGN PATENT DOCUMENTS

| JP | 06-006400 | 1/1994 |
|---|---|---|
| JP | 2003-203435 A | 7/2003 |
| JP | 2004-032125 A | 1/2004 |
| JP | 2004-040587 A | 2/2004 |
| JP | 2005-110201 A | 4/2005 |

OTHER PUBLICATIONS

Arslan et al., Generation in joint demodulation of co-channel signals, 2001, IEEE, p. 1462-1466.*
H. Kawai et al., "Likelihood Function for QRM-MLD Suitable for Soft-Decision Turbo Decoding and Its Performance for OFCDM MIMO Multiplexing in Multipath Fading Channel," IEICE Trans. Commun. vol. E88-B, No. 1, Jan. 2005, pp. 47-57.
3GPP TR 25.848 V4.0.0 (Mar. 2001), "Turbo Decoding", Release 4T, pp. 56-57.

* cited by examiner

*Primary Examiner*—Shelly A Chase
(74) *Attorney, Agent, or Firm*—Foley & Lardner LLP

(57) ABSTRACT

A receiving apparatus has two or more reception antennas, a data reproducer, and a likelihood information generator. The receiving apparatus operates selectively in a first reception mode and a second reception mode depending on the features of signals sent from a transmitting apparatus. In the first reception mode, the receiving apparatus reproduces data and generates likelihood information. In the second reception mode, the receiving apparatus reproduces data using the likelihood information generated in the first reception mode.

20 Claims, 16 Drawing Sheets

Ralated art

WIRELESS COMMUNICATION SYSTEM, RECEIVING APPARATUS WITH A PLURALITY OF ANTENNAS, DEMODULATING METHOD FOR SUCH WIRELESS COMMUNICATION SYSTEM, RECEIVING APPARATUS, AND PROGRAM FOR SUCH DEMODULATING METHOD

BACKGROUND OF THE INVENTION

1. Field of the Invention

The present invention relates to a wireless communication system, and more particularly to a receiving apparatus having a plurality of antennas.

2. Description of the Related Art

Extensive research and development efforts are under way with regard to reception processes for coded MIMO (Multiple Input Multiple Output) systems. One of those reception processes is based on a combination of a complexity-reduced MLD (Maximum Likelihood Detection) process, which has reduced the calculation complexity of the MLD process, and soft-decision decoding, for achieving simple, high-performance reception characteristics. The method disclosed in Hiroyuki KAWAI, Kenichi HIGUCHI, Noriyuki MAEDA, Mamoru SAWAHASHI, Takumi ITO, Yoshikazu KAKURA, Akihisa USHIROKAWA, Hiroyuki SEKI, "Likelihood Function for QRM-MLD Suitable for Soft-Detection Turbo Decoding and Its Performance for QFCDM MIMO Multiplexing in Multipath Fading Channel," IEICE TRANS. Commun., Vol. E88-B, No. 1, January 2005 will be described below with reference to FIG. 1 of the accompanying drawings. For the sake of brevity, it is assumed that propagation paths between receiving and transmitting apparatus comprise flat-fading channels.

FIG. 1 is a block diagram of a conventional wireless communication system for carrying out the method disclosed in the above document.

As shown in FIG. 1, transmitting apparatus 11 has three antennas 21-1, 21-2, 21-3, and receiving apparatus 10 has three antennas 11-1, 11-2, 11-3. Receiving apparatus 10 comprises channel estimator 3111, QR decomposition MLD device 3121, bit likelihood calculator 101, and decoder 3123.

Transmitting apparatus 11 is supplied with three signals $d_1$, $d_2$, $d_3$, generates three transmission signals $s_1$, $s_2$, $s_3$ from supplied signals $d_1$, $d_2$, $d_3$, and sends generated transmission signals $s_1$, $s_2$, $s_3$ through respective antennas 21-1, 21-2, 21-3. Antennas 11-1, 11-2, 11-3 receive respective signals $r_1$, $r_2$, $r_3$ and send received signals $r_1$, $r_2$, $r_3$ to receiving apparatus 10.

Channel estimator 3111 is supplied with received signals $r_1$, $r_2$, $r_3$, estimates transmission paths between transmitting apparatus 11 and receiving apparatus 10 therefrom, and outputs estimated channel values $h_{11}$, $h_{12}$, $h_{13}$, $h_{21}$, $h_{22}$, $h_{23}$, $h_{31}$, $h_{32}$, $h_{33}$ where $h_{ij}$ represents a propagation path provided by antenna 21-$j$ and antenna 11-$i$.

QR decomposition MLD device 3121 is supplied with received signals $r_1$, $r_2$, $r_3$ and estimated channel values $h_{11}$, $h_{12}$, $h_{13}$, $h_{21}$, $h_{22}$, $h_{23}$, $h_{31}$, $h_{32}$, $h_{33}$, calculates symbol candidates and likelihoods of the symbols, and outputs symbol candidate and likelihood pairs $(S_1, e_1) \ldots (S_{256}, e_{256})$ where $S_1$ through $S_{256}$ represents symbol candidates and $e_1$ through $e_{256}$ symbol likelihoods, the number of symbol candidates being 256.

Bit likelihood calculator 101 is supplied with symbol candidate and likelihood pairs $(S_1, e_1) \ldots (S_{256}, e_{256})$, calculates bit likelihood pairs $(L0_1, L1_1)$, $(L0_2, L1_2)$, $(L0_3, L1_3)$, and outputs calculated bit likelihood pairs $(L0_1, L1_1)$, $(L0_2, L1_2)$, $(L0_3, L1_3)$.

Decoder 3123 is supplied with bit likelihood pairs $(L0_1, L1_1)$, $(L0_2, L1_2)$, $(L0_3, L1_3)$, decodes bit likelihood pairs $(L0_1, L1_1)$, $(L0_2, L1_2)$, $L0_3, L1_3)$, and outputs decoded data $d_1$, $d_2$, $d_3$.

Bit likelihood calculator 101 will be described in detail below. Bit likelihood calculator 101 calculates a likelihood that the transmitted bit is 0 and a likelihood that the transmitted bit is 1.

FIG. 2 of the accompanying drawings is a block diagram of bit likelihood calculator 101. As shown in FIG. 2, bit likelihood calculator 101 comprises averager 1011, buffer 1012, and selectors 3221-1, 3221-2, 3221-3.

Averager 1011 is supplied with symbol candidate and likelihood pairs $(S_1, e_1) \ldots (S_{256}, e_{256})$. If both symbol candidates, where each of the bits included in the transmitted three signals is 0, and symbol candidates where each of the bits included in the transmitted three signals is 1, can be selected, then averager 1011 selects the maximum likelihoods of the symbol candidates, averages smaller ones of likelihoods that the bit is 0 and likelihoods that the bit is 1, and outputs average value q.

Buffer 1012 is supplied with symbol candidate and likelihood pairs $(S_1, e_1) \ldots (S_{256}, e_{256})$ for buffering, and stores supplied symbol candidate and likelihood pairs $(S_1, e_1) \ldots (S_{256}, e_{256})$ until the averaging process in averager 1011 is finished.

Each of selectors 3221-1, 3221-2, 3221-3 is supplied with symbol candidate and likelihood pairs $(S_1, e_1) \ldots (S_{256}, e_{256})$ that have been buffered by buffer 1012 and average value q. For calculating a bit likelihood, each selector selects a symbol candidate where each bit is 0 and a symbol candidate where each bit is 1, selects a maximum symbol likelihood of the symbol candidates, and outputs the selected maximum symbol likelihood as a bit likelihood. If there are no symbol candidates including bits 0 or bits 1 and hence each selector is unable to select a bit likelihood, then the selector uses supplied average value q as a bit likelihood of bit 1.

Bit likelihood calculator 101 can widen an averaging interval in averager 1011 to increase the averaging accuracy.

However, the conventional scheme has suffered the following problems:

The first problem is that the scheme causes a large processing delay because of the buffering of the data until the averaging process is over.

Accordingly, it has been difficult to apply the conventional scheme to wireless communication systems which pose strict limitations on any delay times.

The second problem is that the number of samples used for averaging cannot be determined in advance because it is not possible to determine in advance how many symbols that have both bit 0 and bit 1 are present among symbol characteristics that are supplied for the averaging process.

SUMMARY OF THE INVENTION

It is an object of the present invention to provide a means for calculating a bit likelihood without causing a processing delay in a receiving process based on a combination of complexity-reduced MLD and likelihood calculation.

According to the present invention, there is provided a receiving apparatus for carrying out a demodulating process. The receiving apparatus has N antennas (N is an integer of 2 or greater) for receiving signals transmitted from a transmitting apparatus having M antennas (M is an integer of 2 or greater) each for transmitting K types (K is an integer of 2 or greater) of signals composed of at most M spatially multiplexed signals. The receiving apparatus comprises:

data reproducing means so as to be supplied with a received signal received by the N antennas and bit likelihood information, detecting a feature of a signal which is spatially multiplexed on a kth signal (k is an integer of 2 or greater) to switch between a first reception mode and a second reception mode, operating in the first reception mode directly calculating likelihoods where each bit is 1 and likelihoods where each bit is 0 from the received signals as first bit likelihood pairs and outputting a reproduced bit string and the first bit likelihood pairs, and operating in the second reception mode for, if likelihoods where each bit is 1 and likelihoods where each bit is 0 can be directly calculated, directly calculating likelihoods where each bit is 1 and likelihoods where each bit is 0, and for, if likelihoods where each bit is 1 and likelihoods where each bit is 0 cannot directly be calculated, calculating likelihoods from the bit likelihood information as second likelihood pairs, performing soft decision decoding on the second likelihood pairs, and outputting a reproduced bit string; and likelihood information calculating means for being supplied with the received signals and the first bit likelihood pairs, calculating a physical quantity with respect to smaller bit likelihoods of the first likelihood pairs, and outputting the calculated physical quantity as the bit likelihood information.

The data reproducing means may receive the signals in the second reception mode if the product of modulation multi-valued numbers of the signal which is spatially multiplexed on the kth signal is greater than a predetermined value $P_1$ ($P_1$ is $2^M$ or greater), and the data reproducing means may receive the signals in the first reception mode otherwise.

The likelihood information calculating means may average only the smaller bit likelihoods of the first likelihood pairs, and convert an average value into the bit likelihood information using at least one of a transmission parameter of the transmitted signals and a parameter of propagation paths between the antennas.

The likelihood information calculating means may use a layout of constellation points as the transmission parameter.

If the average squared distance between minimum signal points of the kth signal transmitted from an mth antenna is represented by $d2_{k,m,min}$ and if $K_1$ types of signals ($K_1$ is 1 or greater and less than K) are received in the first reception mode and ($K-K_1$) types of signals are received in the second reception mode, then the likelihood information calculating means may generate the bit likelihood information Q as:

$$Q = q \frac{\sum_{k=1}^{K-K_1} \sum_{m=1}^{M} d^2_{k,m,min}}{\sum_{k=1}^{K_1} \sum_{m=1}^{M} d^2_{k,m,min}}$$

where q represents an average value of smaller ones of the first bit likelihood pairs.

Alternatively, if the average squared distance between minimum signal points of the kth signal transmitted from an mth antenna is represented by $d2_{k,m,min}$ and $K_1$ types of signals ($K_1$ is 1 or greater and less than K) are received in the first reception mode and ($K-K_1$) types of signals are received in the second reception mode, then the likelihood information calculating means may generate the bit likelihood information Q as:

$$Q = q \frac{1}{\sum_{n=1}^{N} \left|\sum_{m=1}^{M} hnm\right|^2 \cdot \sum_{m=1}^{M} \frac{1}{\sum_{n=1}^{N} h^2_{nm}}} \cdot \frac{\sum_{k=1}^{K-K_1} \sum_{m=1}^{M} d^2_{k,m,min}}{\sum_{k=1}^{K_1} \sum_{m=1}^{M} d^2_{k,m,min}}$$

where $h_{nm}$ represents the propagation path between an nth reception antenna and the mth transmission antenna, and q an average value of smaller bits of the first bit likelihood pairs.

The wireless communication system according to the present invention includes the receiving apparatus described above, and a program according to the present invention controls the receiving apparatus to perform the above process.

The first wireless communication system according to the present invention has two or more receiving antennas, a data reproducer, and a likelihood information generator. The receiving apparatus operates selectively in a first reception mode and a second reception mode depending on the features of signals sent from a transmitting apparatus. In the first reception mode, the receiving apparatus reproduces data and generates likelihood information. In the second reception mode, the receiving apparatus reproduces data using the likelihood information generated in the first reception mode.

Based on the above arrangement, a delay due to buffering does not occur, and transmitted data can quickly be reproduced.

The second wireless communication system according to the present invention generates likelihood information depending on the parameter of transmission paths between the transmitting apparatus and the receiving apparatus. Based on the above arrangement, a delay due to buffering does not occur, and transmitted data can be received with high performance. Furthermore, the accuracy of bit likelihood information can be prescribed in advance.

According to the present invention, the receiving apparatus operates selectively in reception modes depending on the feature of transmitted signals. Using bit likelihood, that is calculated in one of the reception modes, in the other reception mode, the receiving apparatus can quickly receive signals without causing a processing delay due to buffering.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 3:
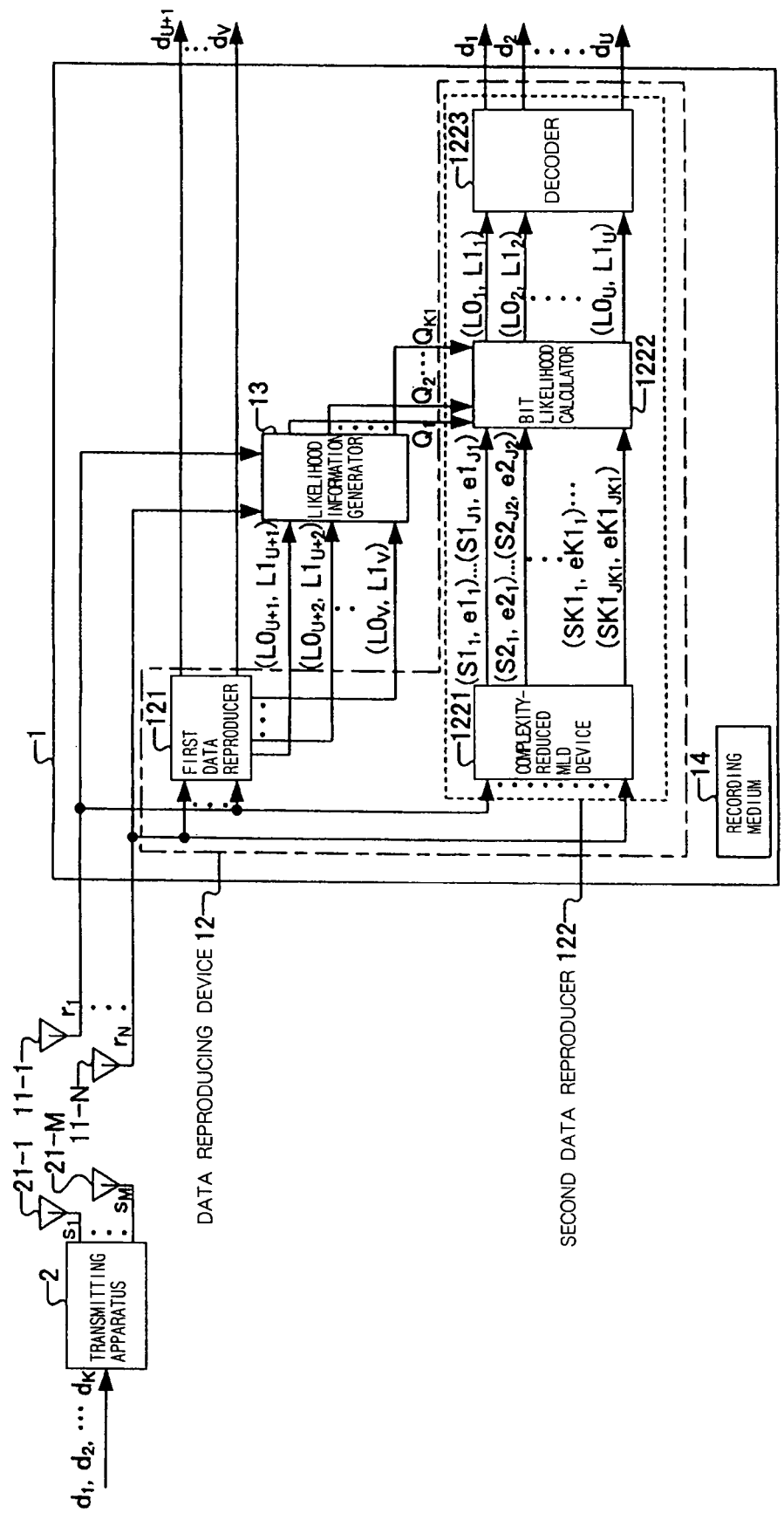
FIG. 3 is a block diagram of a wireless communication system according to the present invention.

FIG. 3 shows in block form a wireless communication system according to the present invention.

As shown in FIG. 3, the wireless communication system according to the present invention comprises transmitting apparatus 2 for transmitting V input signals $d_1, d_2, \ldots, d_V$ (V is any arbitrary number) with transmission signals $s_1, s_2, \ldots, s_M$ sent from respective M antennas 21-1, 21-2, ..., 21-M, and receiving apparatus 1 having N antennas 11-1, 11-2, ..., 11-N.

Receiving apparatus 1 comprises data reproducing device 12, likelihood information generator 13, and recording medium 14. Data reproducing device 12 comprises first data reproducer 121 and second data reproducer 122. Second data reproducer 122 comprises complexity-reduced MLD device 1221, bit likelihood calculator 1222, and decoder 1223. When receiving apparatus 1 is in a first reception mode, first data reproducer 121 and likelihood information generator 13 operates. When receiving apparatus 1 is in a second reception mode, second data reproducer 122 operates. Receiving apparatus 1 switches between the first reception mode and the second reception mode using control signals and data signals in the received signals.

Figure 4:
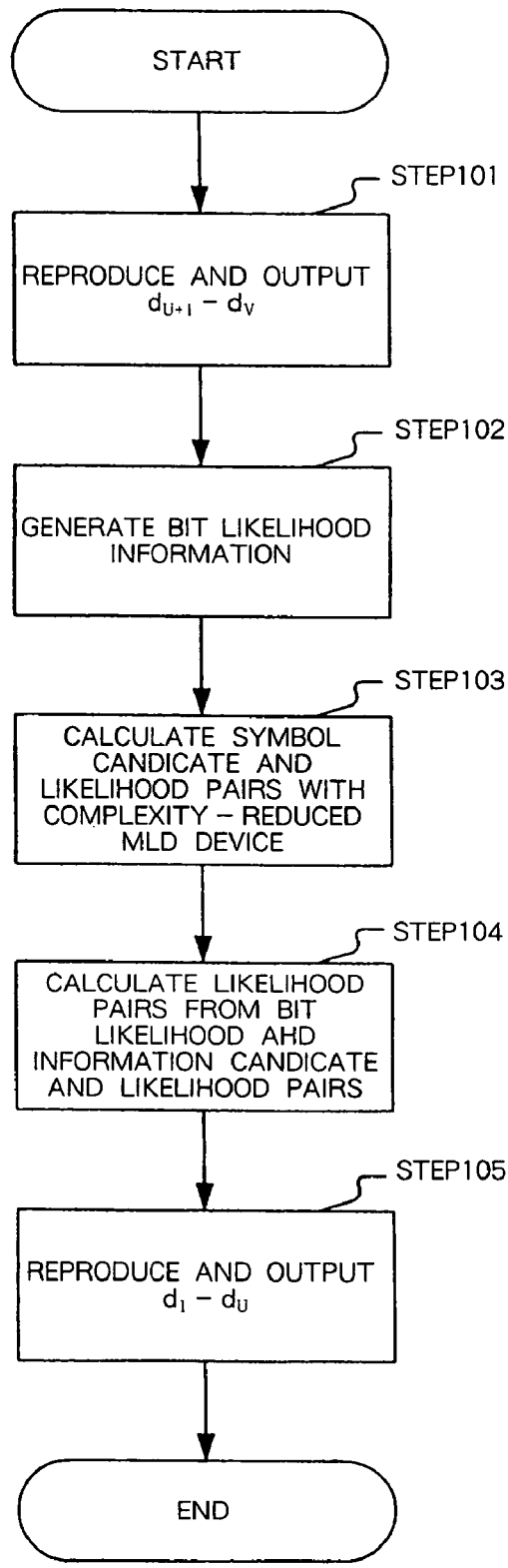
FIG. 4 is a flowchart of a processing sequence of the wireless communication system shown in FIG. 3.

FIG. 4 is a flowchart of a processing sequence of the wireless communication system shown in FIG. 3. Operation of receiving apparatus 1 will be described below with reference to FIG. 4. The processing sequence shown in FIG. 4 is performed by a processor (not shown) which executes a program stored in recording medium 14 of receiving apparatus 1. The scope of the present invention covers such a program.

Received signals $r_1, r_2, \ldots, r_N$ that are received by respective antennas 11-1, 11-2, ..., 11-N are sent to receiving apparatus 1.

In data reproducing device 12, first data reproducer 121 is supplied with received signals $r_1, r_2, \ldots, r_N$, reproduces signals $d_{U+1}, d_{U+2}, \ldots, d_{U+V}$ from control signals contained in the reception signals, and outputs likelihoods where a certain pit is 0 and likelihoods where a certain pit is 1 as bit likelihood pairs $(L0_{U+1}, L1_{U+1}), (L0_{U+2}, L1_{U+2}), \ldots ((L0_V, L1_V)$ in step S101.

Likelihood information generator 13 is supplied with bit likelihood pairs $(L0_{U+1}, L1_{U+1}), (L0_{U+2}, L1_{U+2}), \ldots ((L0_V, L1_V)$ and received signals $r_1, r_2, \ldots, r_N$, generates bit likelihood information $Q_1, Q_2, \ldots, Q_{K1}$ from the control signals in the received signals, and outputs generated bit likelihood information $Q_1, Q_2, \ldots, Q_{K1}$ in step S102.

In second data reproducer 122, complexity-reduced MLD device 1221 is supplied with received signals $r_1, r_2, \ldots, r_N$, calculates symbol candidates for signals of K1 types (K1 is any arbitrary number) and likelihoods for the symbols from the data signals in the received signals, and outputs symbol candidate and likelihood pairs $(S1_1, e1_1) \ldots (S1_{J1}, e1_{J1}), (S2_1, e2_1) \ldots (S2_{J2}, e2_{J2}), \ldots, (SK1_1, eK1_1) \ldots (SK1_{JK1}, eK1_{JK1})$ where $J1, J2, \ldots, K1$ represent the number of symbol candidate and likelihood pairs of first, second, K1th signals, respectively, in step S103.

Bit likelihood calculator 1222 is supplied with symbol candidate and likelihood pairs $(S1_1, e1_1) \ldots (S1_{J1}, e1_{J1}), (S2_1, e2_1) \ldots (S2_{J2}, e2_{J2}), \ldots, (SK1_1, eK1_1) \ldots (SK1_{JK1}, eK1_{JK1})$ and bit likelihood information $Q_1, Q_2, \ldots, Q_{K1}$, calculates bit likelihood pairs $(L0_1, L1_1), \ldots, (L0_U, L1_U)$, and outputs calculated bit likelihood pairs $(L0_0, L1_1), \ldots, (L0_U, L1_U)$ in step S104.

Decoder 1223 is supplied with bit likelihood pairs $(L0_1, L1_1), \ldots, (L0_U, L1_U)$, decodes bit likelihood pairs $(L0_1, L1_1), \ldots, (L0_U, L1_U)$, and reproduces and outputs U data signals $d_1, d_2, \ldots, d_U$ in step S105.

As described above, bit likelihood information is generated from bit likelihood pairs calculated in the first reception mode, and the generated bit likelihood information is used to reproduce and output signals in the second reception mode. In the above description, the two data reproducing devices are employed and operate in the first and second reception modes, respectively. However, the present invention is not limited to the arrangement shown in FIG. 3. One data reproducing device may be employed and applicable demodulating parameters may be controlled to operate the data reproducing device selectively in first and second reception modes.

1st Embodiment

Figure 5:
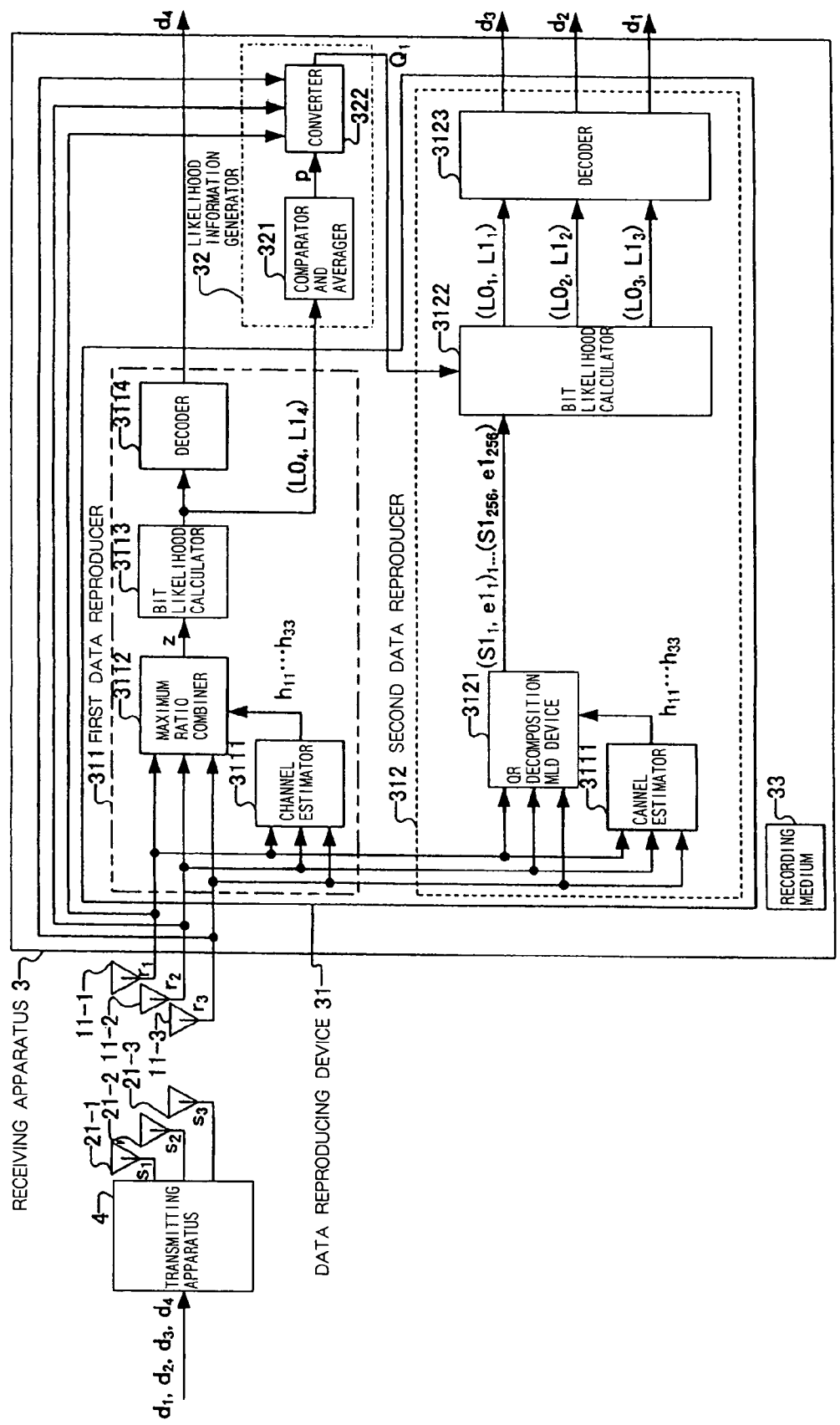
FIG. 5 is a block diagram of a wireless communication system according to a first embodiment of the present invention.

FIG. 5 shows in block form a wireless communication system according to a first embodiment of the present invention. The wireless communication system according to the first embodiment is of basically the same arrangement as the wireless communication system shown in FIG. 3.

As shown in FIG. 5, the wireless communication system according to the first embodiment comprises transmitting apparatus 4 having three antennas 21-1, 21-2, 21-3, and receiving apparatus 3 having three antennas 11-1, 11-2, 11-3.

Receiving apparatus 3 comprises data reproducing device 31, likelihood information generator 32, and recording medium 33. Data reproducing device 31 comprises first data reproducer 311 and second data reproducer 312.

First data reproducer 311 comprises channel estimator 3111, maximum ratio combiner 3112, bit likelihood calculator 3113, and decoder 3114. Second data reproducer 312 comprises channel estimator 3111', QR decomposition MLD device 3121, bit likelihood calculator 3122, and decoder 3123. Likelihood information generator 32 comprises comparator and averager 321 and converter 322.

Figure 6:
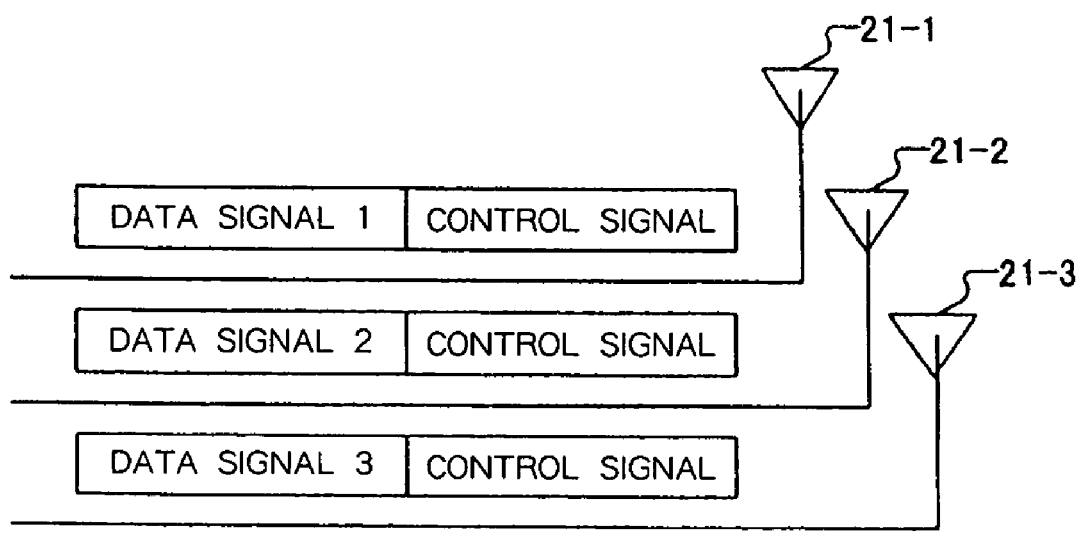
FIG. 6 is a block diagram showing transmission signals according to the first embodiment of the present invention.

FIG. 6 shows the format of signals that are transmitted by transmitting apparatus 4. As shown in FIG. 6, transmitting apparatus 4 sends data signal 1 and a control signal from antenna 21-1, data signal 2 and a control signal from antenna 21-2, and data signal 3 and a control signal from antenna 21-3. Therefore, transmitting apparatus 4 sends two types of signals, or in other words, data signals and control signals. The data signals are sent as three multiplexed signals, and the control signals are sent as non-multiplexed signals. It is assumed that data signals 1, 2, 3 are modulated, i.e., have constellation points arranged, according to 16QAM, and the control signals are modulated, i.e., have constellation points arranged, according to QPSK.

With respect to all the embodiments described below, it is assumed that propagation paths between the receiving and transmitting apparatus comprise flat-fading channels and undergo sufficiently gradual variations. The assumption is introduced for illustrative purposes only and is not intended to limit the scope of the invention in any way.

It is also assumed that the modulating process (constellation) for the control signals and the data signals is known in the receiving apparatus. This assumption is also introduced for illustrative purposes only. If the modulating process is changed by an adaptive control process such as an adaptive modulation process, then it may be handled in the same manner as described below by giving a function to reproduce information about the modulating process change to the likelihood information generator.

In any one of the embodiments, there are two types of transmission signals, one being a control signal and the other a data signal. However, those two types of transmission signals are given for illustrative purpose only and should not limit the scope of the present invention. In addition, though two reception modes are realized by different devices, i.e., the first data reproducer and the second data reproducer in the embodiments, such an arrangement should not limit the scope of the present invention. The two reception modes may be realized by controlling parameters used for reproducing signals.

The difference between control signals which are transmitted as identical signals from the respective antennas and data signals which are transmitted as different signals from the respective antennas will be described below.

It is assumed that control signals are represented by $s^c[t]$. Since the same control signals are transmitted from the respective antennas, the signals received by the reception antennas are expressed as:

$$r_1^c[t] = h_{11}s^c[t] + h_{12}s^c[t] + h_{13}s^c[t] + n_1[t] = (h_{11} + h_{12} + h_{13})s^c[t] + n_1[n] = h_1 s^c[t] + n_1[t]$$

$$r_2^c[t] = h_{21}s^c[t] + h_{22}s^c[t] + h_{23}s^c[t] + n_2[t] = (h_{21} + h_{22} + h_{23})s^c[t] + n_2[n] = h_2 s^c[t] + n_2[t]$$

$$r_3^c[t] = h_{31}s^c[t] + h_{32}s^c[t] + h_{33}s^c[t] + n_3[t] = (h_{31} + h_{32} + h_{33})s^c[t] + n_3[n] = h_3 s^c[t] + n_3[t]$$

where $r_1^c[t]$, $r_2^c[t]$, $r_3^c[t]$ represent received signals at the respective reception antennas, and $h_{ij}$ the propagation path between transmission antenna j and reception antenna i. It is assumed that transmission path fluctuations are sufficiently shorter than signal transmission intervals.

The above equations indicate that if the same signals are transmitted from a plurality of transmission antennas, they can be handled as a signal transmitted from one transmission antenna. Reception processes in such an environment are introduced by many documents. In those reception processes, the best characteristics can be achieved by a maximum ratio combination as described in the present embodiment.

It is assumed that data signals 1, 2, 3 are represented by $s^d_1[t]$, $s^d_2[t]$, $s^d_3[t]$, respectively. In this case, the signals received by the reception antennas are expressed as:

$$r_1^c[t] = h_{11}s_1^c[t] + h_{12}s_2^c[t] + h_{13}s_3^c[t] + n_1[t]$$

$$r_2^c[t] = h_{21}s_1^c[t] + h_{22}s_2^c[t] + h_{23}s_3^c[t] + n_2[t]$$

$$r_3^c[t] = h_{31}s_1^c[t] + h_{32}s_2^c[t] + h_{33}s_3^c[t] + n_3[t]$$

In order to demodulate and decode data signals 1, 2, 3 from a received MIMO signal, a reception process such as QR decomposition MLD as disclosed in the non-patent document referred to above is required.

Figure 7:
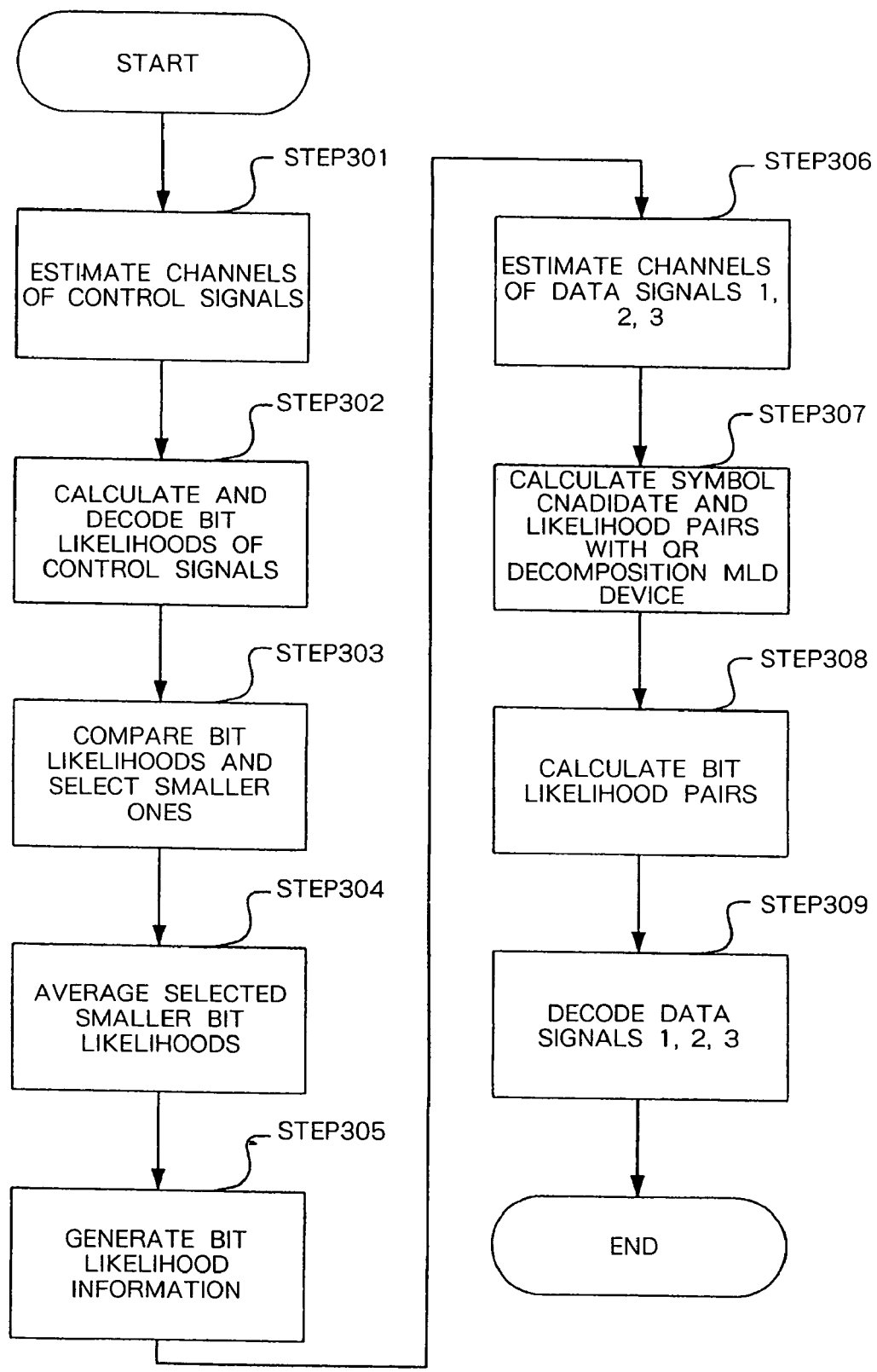
FIG. 7 is a flowchart of a processing sequence of the wireless communication system according to the first embodiment of the present invention.

FIG. 7 is a flowchart of a demodulating process performed by receiving apparatus 3 according to the first embodiment. The processing sequence of receiving apparatus 3 according to the first embodiment will be described below with reference to FIG. 7. The processing sequence shown in FIG. 7 is performed by a processor (not shown) in receiving apparatus 3 which executes a program stored in recording medium 33 of receiving apparatus 3.

Received signals $r_1$, $r_2$, $r_3$ that are received by respective three antennas 11-1, 11-2, 11-3 are sent to receiving apparatus 3.

In first data reproducer 311, channel estimator 3111 is supplied with received signals $r_1$, $r_2$, $r_3$, and estimates channels. Specifically, channel estimator 3111 estimates transmission paths between antennas 21-1, 21-2, 21-3 of transmitting apparatus 4 and antennas 11-1, 11-2, 12-3 of receiving apparatus 10, and outputs estimated channel values $h_{11}$, $h_{12}$, $h_{13}$, $h_{21}$, $h_{22}$, $h_{23}$, $h_{31}$, $h_{32}$, $h_{33}$ in step S301.

Then, maximum ratio combiner 3112, bit likelihood calculator 20 3113, and decoder 3113 decode control channels in step S302. Specifically, maximum ratio combiner 3112 is supplied with received signals $r_1$, $r_2$, $r_3$ and estimated channel values $h_{11}$, $h_{12}$, $h_{13}$, $h_{21}$, $h_{22}$, $h_{23}$, $h_{31}$, $h_{32}$, $h_{33}$, generates demodulated signal $z^c[t]$ therefrom, and outputs generated demodulated signal $z^c[t]$. Demodulated signal $z^c[t]$ is expressed as:

$$z^c[t] = \frac{(h_{11}+h_{12}+h_{13}) * r_1^c[t] + (h_{21}+h_{22}+h_{23}) * r_2^c[t] + (h_{31}+h_{32}+h_{33}) * r_3^c[t]}{|h_{11}+h_{12}+h_{13}|^2 + |h_{21}+h_{22}+h_{23}|^3 + |h_{31}+h_{32}+h_{33}|^3}$$

where $r_1^c[t]$, $r_2^c[t]$, $r_3^c[t]$ represent received signals at respective antennas 11-1, 11-2, 11-3.

Bit likelihood calculator 3113 is supplied with demodulated signal $z^c[t]$, calculates bit likelihood pair ($L0_4$, $L1_4$), and outputs calculated bit likelihood pair ($L0_4$, $L1_4$). Bit likelihood pair ($L0_4$, $L1_4$) may be calculated according to 3GPP, TR25.848(HSDPA), A1.4, for example. Decoder 3123 is supplied with bit likelihood pair (L0$_4$, L1$_4$), decodes it, and outputs reproduced data d$_4$.

Likelihood information generator 32 will be described below. Likelihood information generator 32 is supplied with bit likelihood pair (L0$_4$, L1$_4$) and received signals r$_1$, r$_2$, r$_3$.

In likelihood information generator 32, comparator and averager 321 is supplied with bit likelihood pair (L0$_4$, L1$_4$), compares likelihoods where each bit is 0 and likelihoods where each bit is 1, selects smaller likelihoods in step S303, averages the selected likelihoods, and outputs the averaged likelihood as average second likelihood q in step S304.

Converter 322 is supplied with average second likelihood q and received signals r$_1$, r$_2$, r$_3$, generates bit likelihood information Q$_1$ therefrom, and outputs generated bit likelihood information Q$_1$ in step S305.

Figure 8:
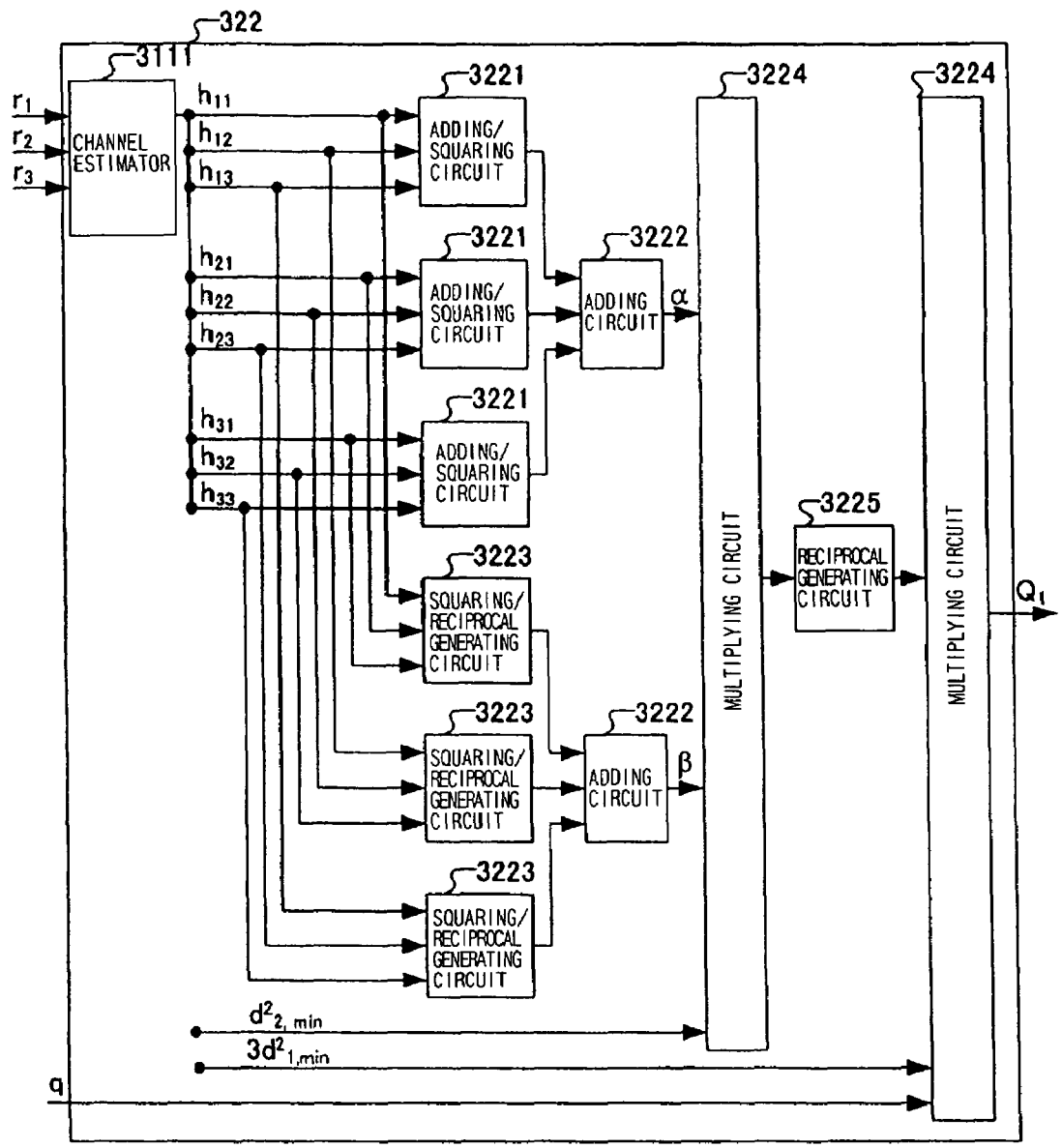
FIG. 8 is a block diagram of a converter of the wireless communication system shown in FIG. 5.

FIG. 8 shows converter 322 in block form. As shown in FIG. 8, converter 322 comprises channel estimator 31 11, a plurality of adding/squaring circuits 3221, a pair of adding circuits 3222, a plurality of squaring/reciprocal generating circuits 3223, a pair of multiplying circuits 3224, and reciprocal generating circuit 3225.

Figure 9:
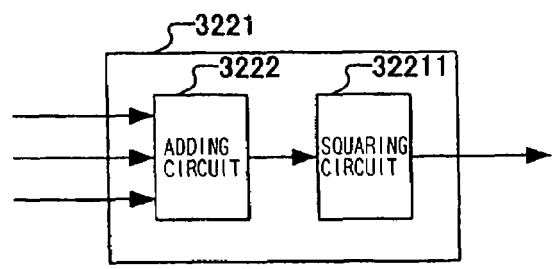
FIG. 9 is a block diagram of an adding/squaring circuit of the converter shown in FIG. 8.

FIG. 9 shows in block form each of adding/squaring circuits 3221. As shown in FIG. 9, adding/squaring circuit 3221 comprises adding circuit 3222 and squaring circuit 32211.

Figure 10:
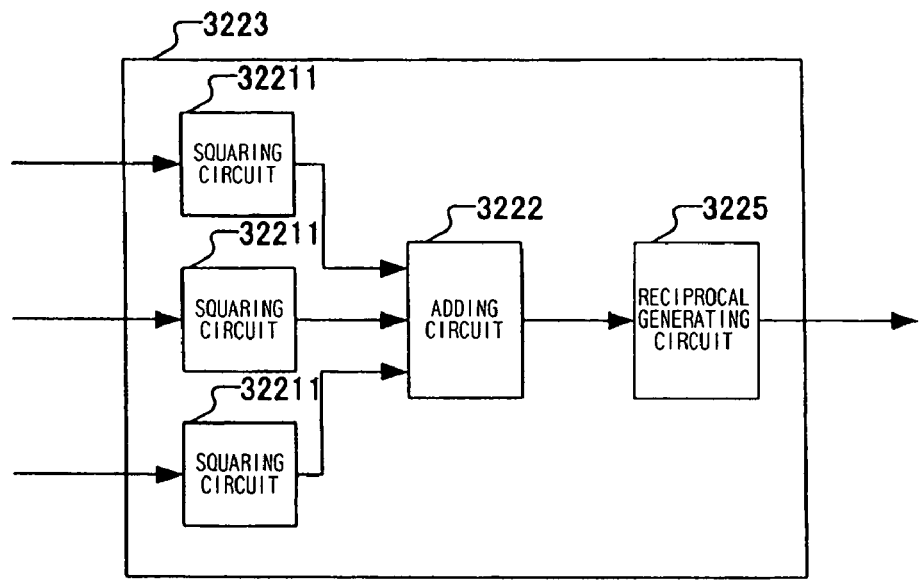
FIG. 10 is a block diagram of a squaring/reciprocal generating circuit of the converter shown in FIG. 8.

FIG. 10 shows in block form each of squaring/reciprocal generating circuits 3223. As shown in FIG. 10, squaring/reciprocal generating circuit 3223 comprises squaring circuit 32211, adding circuit 3222, and reciprocal generating circuit 3225.

In converter 3122, based on estimated channel values h$_{11}$, h$_{12}$, h$_{13}$, h$_{21}$, h$_{22}$, h$_{23}$, h$_{31}$, h$_{32}$, h$_{33}$, adding/squaring circuits 3221 and adding circuits 3222 calculate α=|h$_{11}$+h$_{12}$+h$_{13}$|$^2$+|h$_{21}$+h$_{22}$+h$_{23}$|$^2$+|h$_{31}$+h$_{32}$+h$_{33}$|$^2$, and squaring/reciprocal generating circuits 3223 and adding circuits 3222 calculate $$\beta = \frac{1}{|h_{11}|^2 + |h_{21}|^2 + |h_{31}|^2} + \frac{1}{|h_{12}|^2 + |h_{22}|^2 + |h_{32}|^2} + \frac{1}{|h_{13}|^2 + |h_{23}|^2 + |h_{33}|^2}$$

From α, β thus calculated, multiplying circuits 3224 and reciprocal generating circuit 3225 generate bit likelihood information Q$_1$ as follows:

$$Q_1 = q \frac{3}{\alpha\beta} \frac{d_{1,min}^2}{d_{2,min}^2}$$

where d$^2_{2,min}$, d$^2_{1,min}$ represent average squared distances between minimum signal points of the control signals and the data signals. An average squared distance between minimum signal points refers to an average value of squared distances between minimum signal points from a certain symbol to another symbol that has a one bit difference from the certain symbol. If Gray coding is assumed, then d$^2_{min}$ is equal to the square of a minimum signal converted distance because the constellation points for QPSK are symmetrical.

Bit likelihood information Q$_1$ described above is peculiar to the system having three transmission antennas and three reception antennas. If K types (K is an integer of 2 or greater) of signals, composed of at most M spatially multiplexed signals, are transmitted to each of M transmission antennas (M is an integer of 2 or greater) and received by N antennas (N is an integer of 2 or greater), and if the average squared distance between minimum signal points of the kth signal transmitted from the mth antenna is represented by d$_{k,m,min}$ and if K$_1$ types of signals (K$_1$ is 1 or greater and less than K) are received in the first reception mode and (K−K$_1$) types of signals are received in the second reception mode, then general bit likelihood information Q is expressed as:

$$Q = q \frac{1}{\sum_{n=1}^{N} \left| \sum_{m=1}^{M} hnm \right|^2 \cdot \sum_{m=1}^{M} \frac{1}{\sum_{n=1}^{N} h_{nm}^2}} \cdot \frac{\sum_{k=1}^{K-K_1} \sum_{m=1}^{M} d_{k,m,min}^2}{\sum_{k=1}^{K_1} \sum_{m=1}^{M} d_{k,m,min}^2}$$

where h$_{nm}$ represents the propagation path between the nth reception antenna and the mth transmission antenna, and q an average value of smaller bits of the first bit likelihood pairs.

According to 16QAM, an average value is produced based on the positions of constellation points even if Gray coding is assumed.

Figure 21:
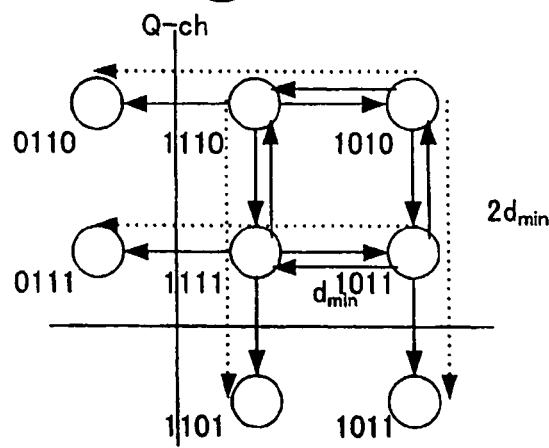
FIG. 21 is a diagram illustrative of an average squared distance between minimum signal points.

FIG. 21 shows a portion of a pattern of constellation points according to 16QAM that are only in the first quadrant. There are four symbols in positions that are nearest constellation point 1111 which have a different from 1 bit therefrom. There is one such symbol in a position other than the positions nearest each of constellation points 1110, 1011, and there are two such symbols in positions other than the positions nearest constellation point 1010. These symbols are averaged to provide:

$$d_{1,min}^2 = \{4d_{min}^2 + 2(3d_{min}^2 + 4d_{min}^2) + 2d_{min}^2 + 8d_{min}^2\} \cdot \frac{1}{16} = \frac{28}{16} d_{min}^2$$

where d$^2_{min}$ represents the distance between minimum signals according to 16QAM.

Second data reproducer 312 will be described below. Second data reproducer 312 is supplied with received signals r$_1$, r$_2$, r$_3$ and bit likelihood information Q$_1$.

Channel estimator 3111' is supplied with received signals r$_1$, r$_2$, r$_3$, estimates channels therefrom, and outputs estimated channel values h$_{11}$, h$_{12}$, h$_{13}$, h$_{21}$, h$_{22}$, h$_{23}$, h$_{31}$, h$_{32}$, h$_{33}$ in step S306. QR decomposition MLD device 3121 is supplied with received signals r$_1$, r$_2$, r$_3$, and estimated channel values h$_{11}$, h$_{12}$, h$_{13}$, h$_{21}$, h$_{22}$, h$_{23}$, h$_{31}$, h$_{32}$, h$_{33}$ from channel estimator 3111', symbol candidates and likelihoods of the symbols with respect to data signals 1, 2, 3, and outputs symbol candidate and likelihood pairs (S1$_1$, e1$_1$) ... (S1$_{256}$, e1$_{256}$) in step S307. In the present embodiment, the number of symbol candidates is 256. The amount of calculations required is much smaller than if the MLD process is applied to calculate 4096 symbol candidate and likelihood pairs.

Bit likelihood calculator 3122 is supplied with symbol candidate and likelihood pairs (S1$_1$, e1$_1$) ... (S1$_{256}$, e1$_{256}$) from QR decomposition MLD device 3121 and bit likelihood information Q$_1$ from converter 322, calculates bit likelihood pairs (L0$_1$, L1$_1$), (L0$_2$, L1$_2$), (L0$_3$, L1$_3$) of data signals 1, 2, 3, and outputs calculated bit likelihood pairs (L0$_1$, L1$_1$), (L0$_2$, L1$_2$), (L0$_3$, L1$_3$) in step S308. Decoder 3123 is supplied with bit likelihood pairs (L0$_1$, L1$_1$), (L0$_2$, L1$_2$), (L0$_3$, L1$_3$), decodes bit likelihood pairs (L0$_1$, L1$_1$), (L0$_2$, L1$_2$), (L0$_3$, L1$_3$), and outputs decoded data d$_1$, d$_2$, d$_3$ in step S309.

Figure 11:
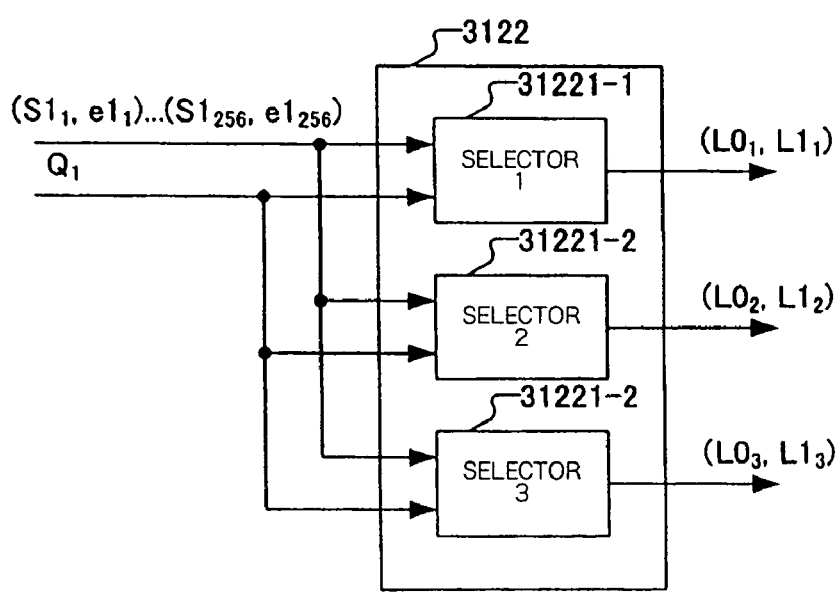
FIG. 11 is a block diagram of a bit likelihood calculator of the wireless communication system shown in FIG. 5.

Bit likelihood calculator 3122 will be described below FIG. 11 shows bit likelihood calculator 3122 in block form.

As shown in FIG. 11, bit likelihood calculator 3122 comprises selectors 31221-1, 31221-2, 31221-3.

Each of selectors 31221-1, 31221-2, 31221-3 is supplied with symbol candidate and likelihood pairs ($S1_1$, $e1_1$) ... ($S1_{256}$, $e1_{256}$) and bit likelihood information $Q_1$. Each of selectors 31221-1, 31221-2, 31221-3 selects, from 256 symbols, symbol candidates where each bit is 0 and symbol candidates where each bit is 1, and selects the maximum symbol likelihood among the selected symbol candidates as bit likelihood for bit 0 or bit 1. If there is no symbol candidate for bit 0 or no symbol candidate for bit 1, then each of selectors 31221-1, 31221-2, 31221-3 selects the bit likelihood information as bit likelihood. Accordingly, bit likelihood calculator 3122 can reliably calculate the likelihood for each bit 0 and each bit 1 regardless of the existence of symbol candidates.

According to the present embodiment, since the bit likelihood calculator, which links the complexity-reduced MLD device, does not need to perform an averaging process in calculating bit likelihood, the bit likelihood calculator does not suffer a processing delay due to an averaging process and hence can quickly calculate the bit likelihood. In addition, because bit likelihood information is calculated by the first data reproducer, the averaging accuracy of the bit likelihood information is determined by the first data reproducer. Therefore, the accuracy of the bit likelihood information is determined in advance until the second data reproducer starts to calculate the bit likelihood.

The processing operation of likelihood information generator 32 has been described above by way of example only for the purpose of illustrating the above embodiment. Specific operational details of likelihood information generator 32 are not limited to the processing operation described above.

2nd Embodiment

Figure 12:
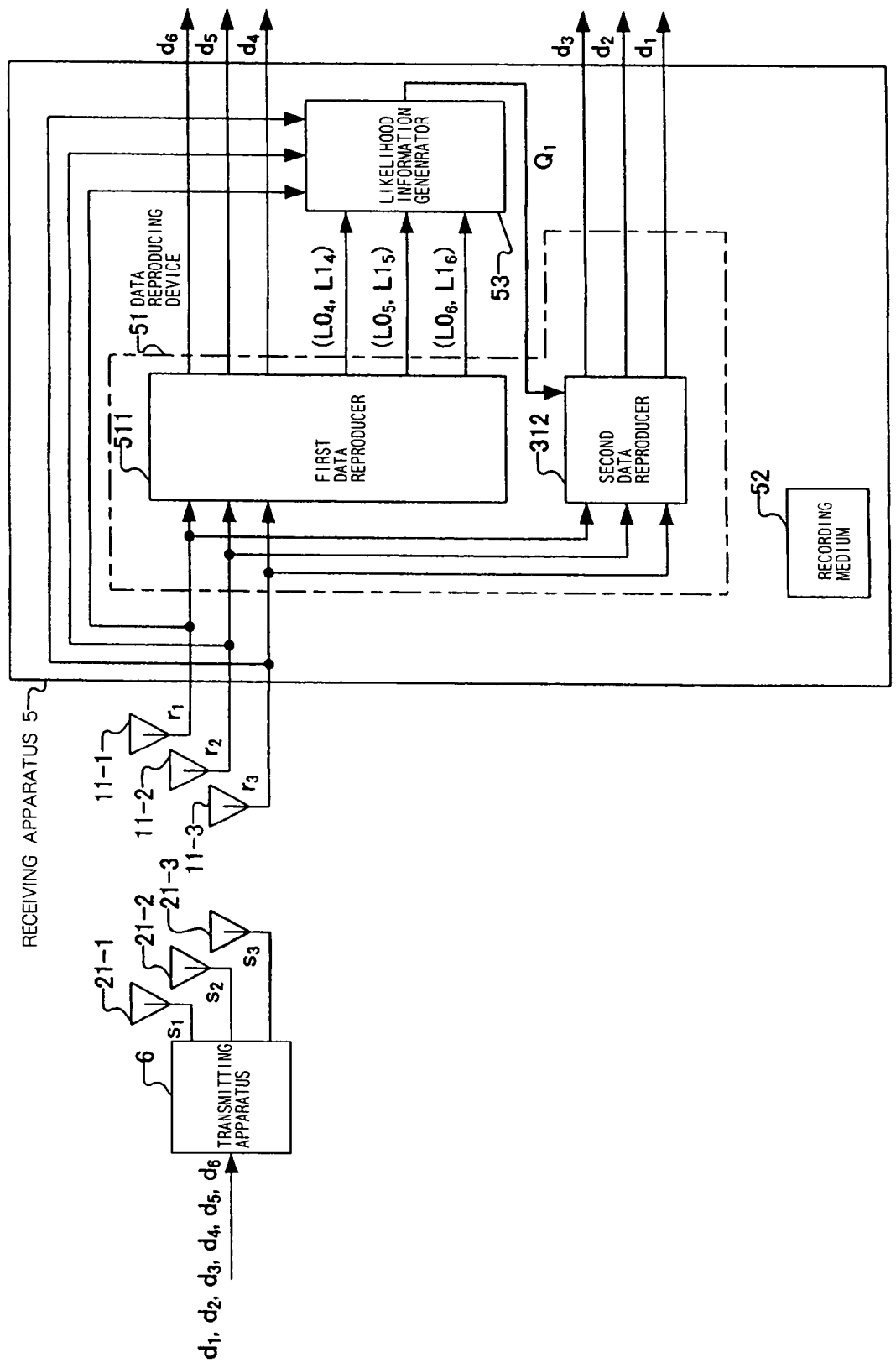
FIG. 12 is a block diagram of a wireless communication system according to a second embodiment of the present invention.

FIG. 12 shows in block form a wireless communication system according to a second embodiment of the present invention. The wireless communication system according to the second embodiment is similar in structure to the wireless communication system shown in FIG. 3.

As shown in FIG. 12, the wireless communication system according to the second embodiment comprises transmitting apparatus 6 having three antennas 21-1, 21-2, 21-3, and receiving apparatus 5 having three antennas 11-1, 11-2, 11-3.

Receiving apparatus 5 comprises data reproducing device 51, likelihood information generator 53, and recording medium 52. Data reproducing device 51 comprises first data reproducer 511 and second data reproducer 512.

Figure 13:
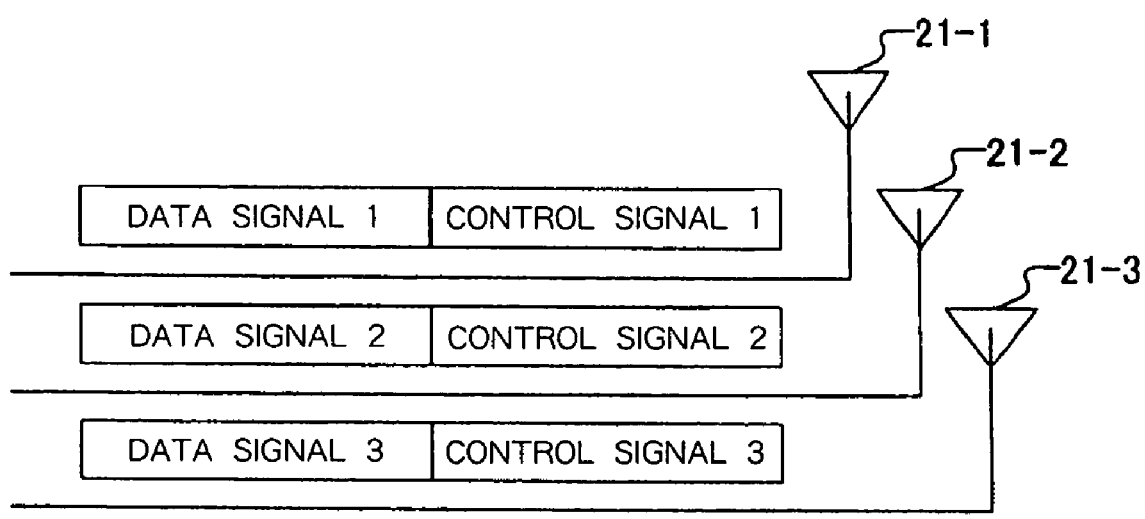
FIG. 13 is a block diagram showing transmission signals according to the second embodiment of the present invention.

FIG. 13 shows the format of signals that are transmitted by transmitting apparatus 6. As shown in FIG. 13, transmitting apparatus 6 sends data signal 1 and control signal 1 from antenna 21-1, data signal 2 and control signal 2 from antenna 21-2, and data signal 3 and control signal 3 from antenna 21-3. Therefore, transmitting apparatus 6 sends two types of signals, or in other words, data signals and control signals. The data signals are sent as three multiplexed signals, and the control signals are also sent as three multiplexed signals. It is assumed that data signals 1, 2, 3 are modulated, i.e., have constellation points arranged according to 16QAM, and control signals 1, 2, 3 are modulated, i.e., have constellation points arranged according to QPSK.

Figure 14:
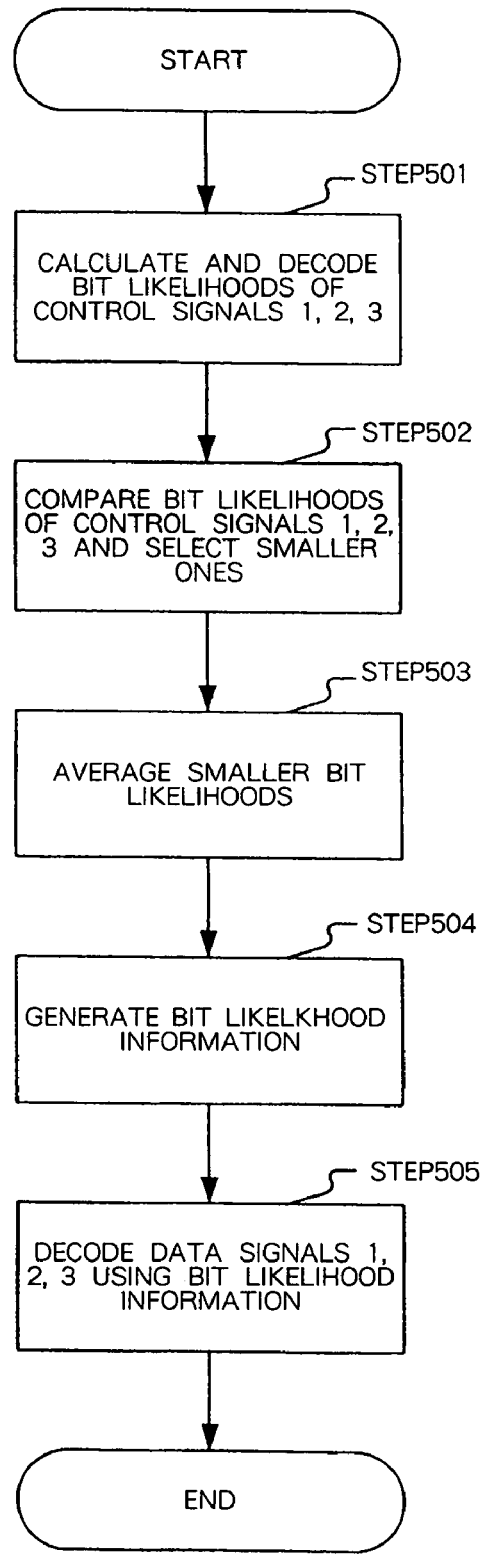
FIG. 14 is a flowchart of a processing sequence of the wireless communication system according to the second embodiment of the present invention.

FIG. 14 is a flowchart of a demodulating process performed by receiving apparatus 5 according to the second embodiment. The processing sequence of receiving apparatus 5 according to the second embodiment will be described below with reference to FIG. 14. The processing sequence shown in FIG. 15 is performed by a processor (not shown) in receiving apparatus 5 which executes a program stored in recording medium 52 of receiving apparatus 5.

Signals $r_1$, $r_2$, $r_3$ that are received by respective antennas 11-1, 11-2, 11-3 are sent to receiving apparatus 5. In receiving apparatus 5, first data reproducer 511 outputs reproduced data signals $d_4$, $d_5$, $d_6$ and bit likelihood pairs ($L0_4$, $L1_4$), ($L0_5$, $L1_5$), ($L0_6$, $L1_6$). Likelihood information generator 53 is supplied with bit likelihood pairs ($L0_4$, $L1_4$), ($L0_5$, $L1_5$), ($L0_6$, $L1_6$) and outputs bit likelihood information $Q_1$ in step S501.

Second data reproducer 312 is supplied with received signals $r_1$, $r_2$, $r_3$ and bit likelihood information $Q_1$, decodes them, and outputs data signals $d_1$, $d_2$, $d_3$ in step S505 in the same manner as in the first embodiment. The wireless communication system according to the second embodiment differs from the wireless communication system according to the first embodiment with regard to first data reproducer 511 and likelihood information generator 53. Therefore, first data reproducer 511 and likelihood information generator 53 will be described in detail below.

Figure 15:
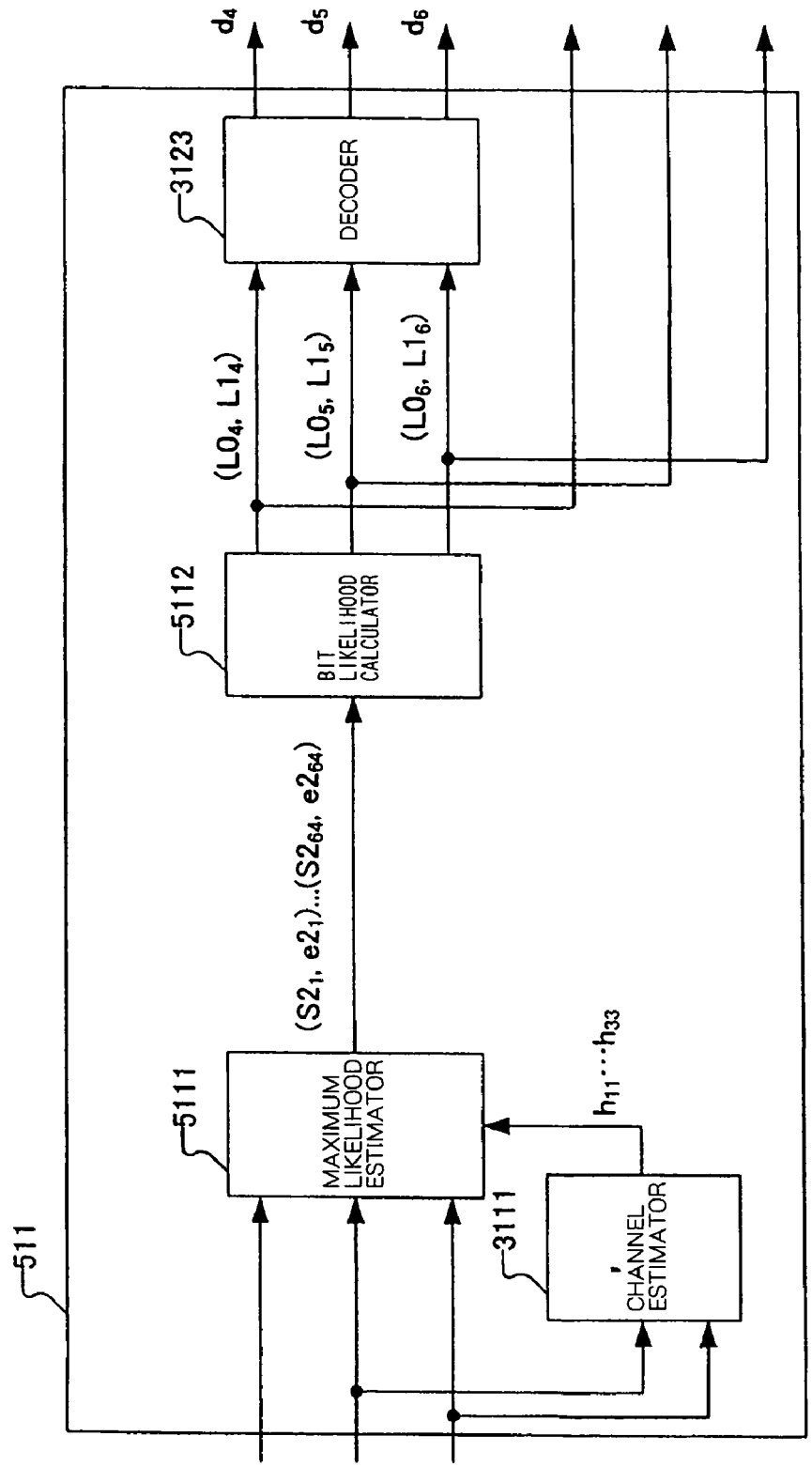
FIG. 15 is a block diagram of a first data reproducer of the wireless communication system shown in FIG. 12.

FIG. 15 shows first data reproducer 511 in block form.

As shown in FIG. 15, first data reproducer 511 comprises channel estimator 31 11, maximum likelihood estimator 5111, bit likelihood calculator 5112, and decoder 3123.

Channel estimator 3111 is supplied with received signals $r_1$, $r_2$, $r_3$, estimates transmission paths therefrom, and outputs estimated channel values $h_{11}$, $h_{12}$, $h_{13}$, $h_{21}$, $h_{22}$, $h_{23}$, $h_{31}$, $h_{32}$, $h_{33}$. Maximum likelihood estimator 5111 calculates likelihoods for all symbol candidates which have possibly been transmitted, calculates symbol candidates and likelihoods for the symbols, and outputs symbol candidate and likelihood pairs ($S2_1$, $e2_1$), ..., ($S2_{64}$, $e2_{64}$) according to the maximum likelihood estimating method disclosed in Ohgane, Nishimura, Ogawa "Space Division Multiplexing and its Basic Characteristics in MIMO Channels," IEICE Transactions B, J87-B, No. 9, p. 1162-1173, September 2004.

Bit likelihood calculator 5112 is supplied with symbol candidate and likelihood pairs ($S2_1$, $e2_1$), ..., ($S2_{64}$, $e2_{64}$) and calculates and outputs bit likelihood pairs ($L0_4$, $L1_4$), ($L0_5$, $L1_5$), ($L0_6$, $L1_6$). The product according to the modulating process for control signals is 64, which is sufficiently smaller than the product 4096 according to the modulating process for data signals. In such a case, signals can easily be received with high performance by using the maximum likelihood estimating method. According to the maximum likelihood estimating method, since symbol likelihoods for all symbol candidates are output, candidates where each bit is 0 and candidates where each bit is 1 are included without fail. By selecting maximum symbol likelihood for symbol candidates where each bit is 0 or 1 as bit likelihood, the bit likelihood can be directly calculated.

Decoder 3123 is supplied with bit likelihood pairs ($L0_4$, $L1_4$), ($L0_5$, $L1_5$), ($L0_6$, $L1_6$), decodes them, and outputs data signals $d_4$, $d_5$, $d_6$.

Figure 16:
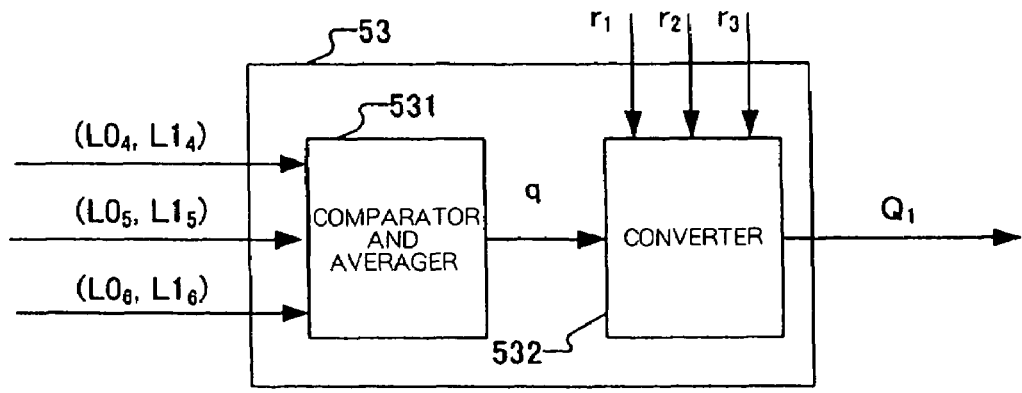
FIG. 16 is a block diagram of a likelihood information generator of the wireless communication system shown in FIG. 12.

FIG. 16 shows likelihood information generator 53 in block form.

As shown in FIG. 16, likelihood information generator 53 comprises comparator and averager 531 and converter 532.

Comparator and averager 531 is supplied with bit likelihood pairs ($L0_4$, $L1_4$), ($L0_5$, $L1_5$), ($L0_6$, $L1_6$), compares likelihoods where each bit is 0 and likelihoods where each bit is 1, selects smaller likelihoods in step S523 (FIG. 14), averages the selected likelihoods, and outputs the averaged likelihood as average second likelihood q in step S503.

Converter 532 is supplied with average second likelihood q and received signals $r_1$, $r_2$, $r_3$, generates bit likelihood information $Q_1$ therefrom, and outputs generated bit likelihood information $Q_1$ in step S504.

Figure 17:
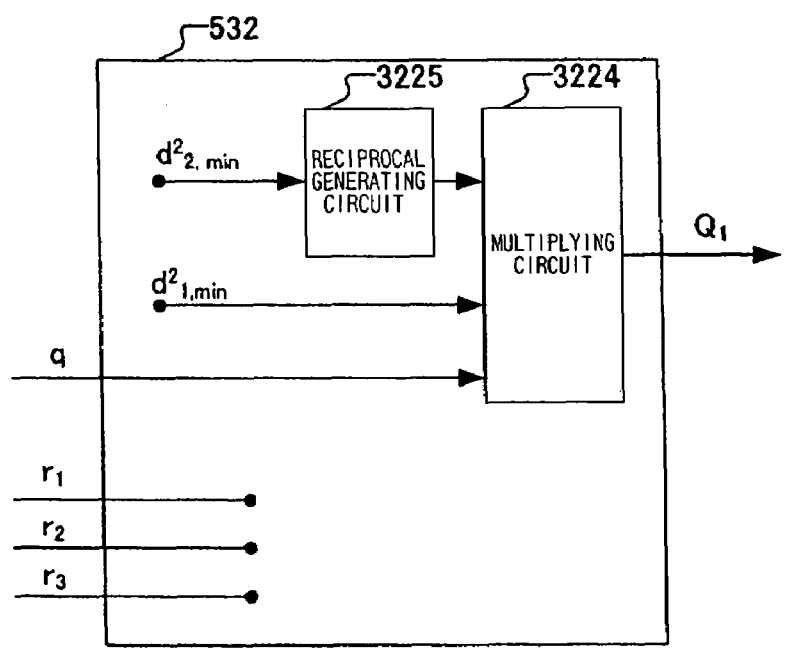
FIG. 17 is a block diagram of a converter of the likelihood information generator shown in FIG. 16.

FIG. 17 shows converter 532 in block form.

As shown in FIG. 17, converter 532 comprises reciprocal generating circuit 3225 and multiplying circuit 3224.

Reciprocal generating circuit 3225 is supplied with average squared distance $d^2_{2,min}$ between minimum signal points of control signals, and outputs the reciprocal thereof. Multiplying circuit 3224 multiplies the reciprocal, average squared distance $d^2_{1,min}$ between minimum signal points of data signals, and average second likelihood q, and outputs the product as bit likelihood information $Q_1$. Bit likelihood information $Q_1$ is expressed as:

$$Q_1 = q \frac{d^2_{1,min}}{d^2_{2,min}}$$

Bit likelihood information $Q_1$ described above is peculiar to a system having three transmission antennas and three reception antennas. If K types (K is an integer of 2 or greater) of signals composed of at most M spatially multiplexed signals are transmitted to each of M transmission antennas (M is an integer of 2 or greater) and received by N antennas (N is an integer of 2 or greater), and if the average squared distance between minimum signal points of the kth signal transmitted from the mth antenna is represented by $d2_{k,m,min}$ and if $K_1$ types of signals ($K_1$ is 1 or greater and less than K) are received in the first reception mode and $(K-K_1)$ types of signals are received in the second reception mode, then general bit likelihood information Q is expressed as:

$$Q = q \frac{\sum_{k=1}^{K-K_1} \sum_{m=1}^{M} d^2_{k,m,min}}{\sum_{k=1}^{K_1} \sum_{m=1}^{M} d^2_{k,m,min}}$$

where q represents an average value of smaller bits of the first bit likelihood pairs.

In the first embodiment, the conversion is based on the estimated propagation path response and the constellation points layout. According to the present embodiment, the conversion is based on only the constellation points layout because both the control signals and the data signals are transmitted through MIMO channels.

According to the present embodiment, even through control signals are transmitted through MIMO channels, bit likelihood information can reliably be generated by applying the demodulating process which is capable of reliably calculating bit likelihood. As a result, since no averaging process is required for calculating bit likelihood with the second data reproducer, the second data reproducer does not suffer a processing delay due to an averaging process and hence can quickly calculate bit likelihood.

The processing operation of likelihood information generator 53 has been described above by way of example only for the purpose of illustrating the above embodiment. Specific operational details of likelihood information generator 53 are not limited to the processing operation described above.

3rd Embodiment

According to a third embodiment of the present invention, three data signals and three control signals are transmitted as shown in FIG. 13 as in the second embodiment. In the present embodiment, it is assumed that the data signals are modulated according to one modulating process, and the control signals are modulated according to respective different modulating processes.

Figure 18:
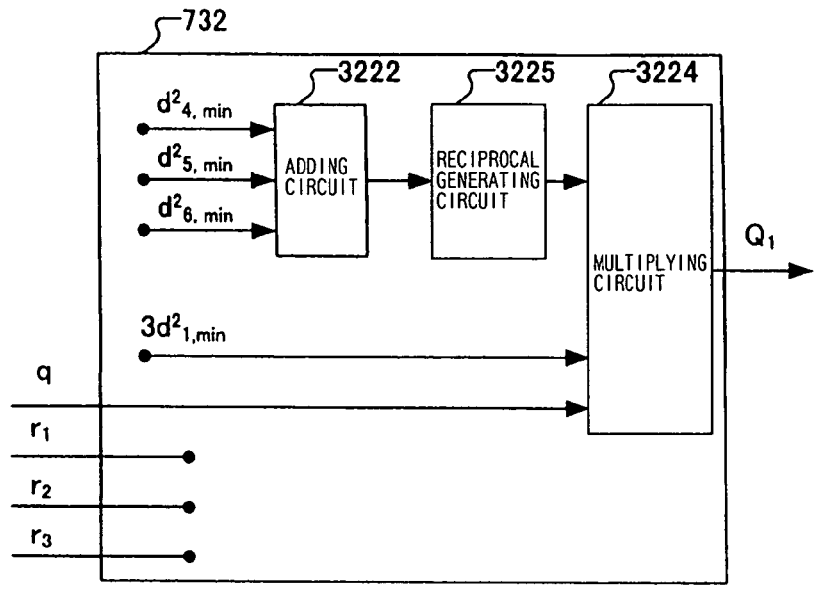
FIG. 18 is a block diagram of a likelihood information generator according to a third embodiment of the present invention.

According to the third embodiment, converter 532 shown in FIG. 16 is replaced with converter 732 shown in FIG. 18. Stated otherwise, the receiving apparatus according to the third embodiment differs from the receiving apparatus according to the second embodiment only with regard to converter 732. Details of converter 732 will be described below.

FIG. 18 shows converter 732 in block form. As shown in FIG. 18, converter 732 comprises adding circuit 3222, reciprocal generating circuit 3225, and multiplying circuit 3224.

Converter 732 is supplied with average second likelihood q. In converter 732, adding circuit 3222, reciprocal generating circuit 3225, and multiplying circuit 3224 calculate bit likelihood information $Q_1$ as follows:

$$Q_1 = 3 \frac{d^2_{1,min}}{d^2_{4,min} + d^2_{5,min} + d^2_{6,min}} q$$

where $d^2_{4,min}$, $d^2_{5,min}$, $d^2_{6,min}$ represent respective average squared distances between minimum signal points of control signals 1, 2, 3, and $d^2_{1,min}$ an represent average squared distance between minimum signal points of the data signals.

According to the present embodiment, even though the control signals are modulated according to respective different modulating processes, bit likelihood information can be generated from the average second likelihood by a weighting process that is performed by converter 732 depending on the layout of constellation points of the control signals.

4th Embodiment

According to a fourth embodiment of the present invention, three data signals and three control signals are transmitted as shown in FIG. 13 as with the second embodiment. In the present embodiment, it is assumed that the data signals and the control signals may not necessarily be modulated according to one modulating process.

Figure 19:
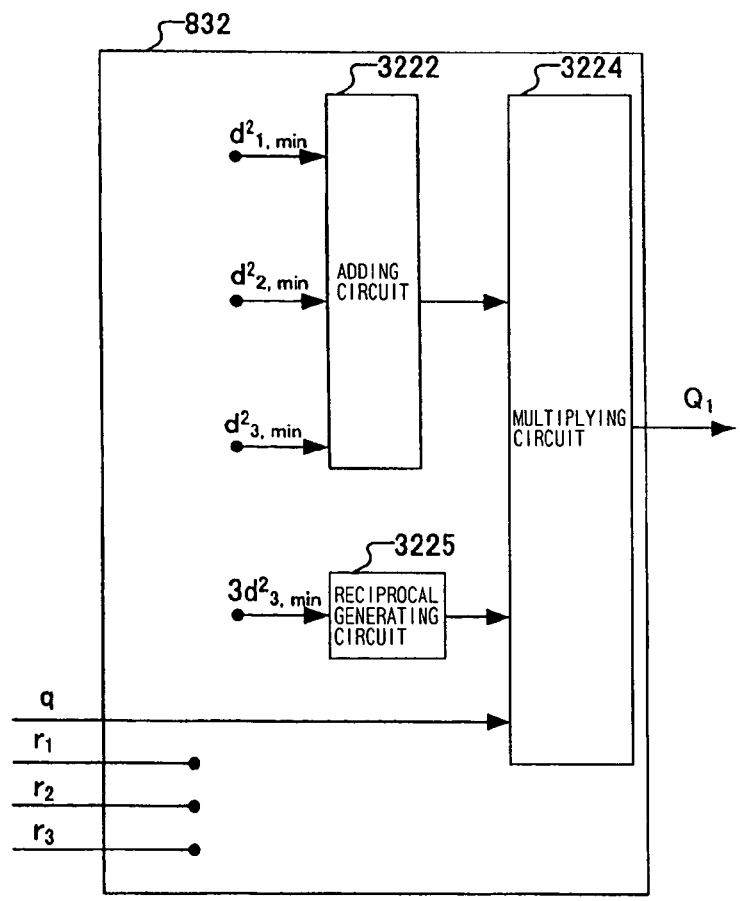
FIG. 19 is a block diagram of a likelihood information generator according to a fourth embodiment of the present invention.

According to the fourth embodiment, converter 532 shown in FIG. 16 is replaced with converter 832 shown in FIG. 19. Stated otherwise, the receiving apparatus according to the fourth embodiment differs from the receiving apparatus according to the second embodiment only as regards converter 832. Details of converter 832 will be described below.

FIG. 19 shows converter 832 in block form. As shown in FIG. 19, converter 832 comprises reciprocal generating circuit 3225, adding circuit 3222, and multiplying circuit 3224.

In converter 732, reciprocal generating circuit 3225, adding circuit 3222, and multiplying circuit 3224 convert the average second likelihood q into bit likelihood information $Q_1$ according to the equation:

$$Q_1 = \frac{d_{1,min}^2 + d_{2,min}^2 + d_{3,min}^2}{3d_{4,min}^2} q$$

and output calculated bit likelihood information $Q_1$, where $d^2_{1,min}$, $d^2_{2,min}$, $d^2_{3,min}$ represent respective average squared distances between minimum signal points of data signals 1, 2, 3, and $d^2_{4,min}$ represent an average squared distance between minimum signal points of the control signals.

According to the present embodiment, even though the layout of signal points of data signals is not constant, bit likelihood information can be determined.

5th Embodiment

According to a fifth embodiment, three data signals and one control signal are transmitted as with the first embodiment.

Figure 20:
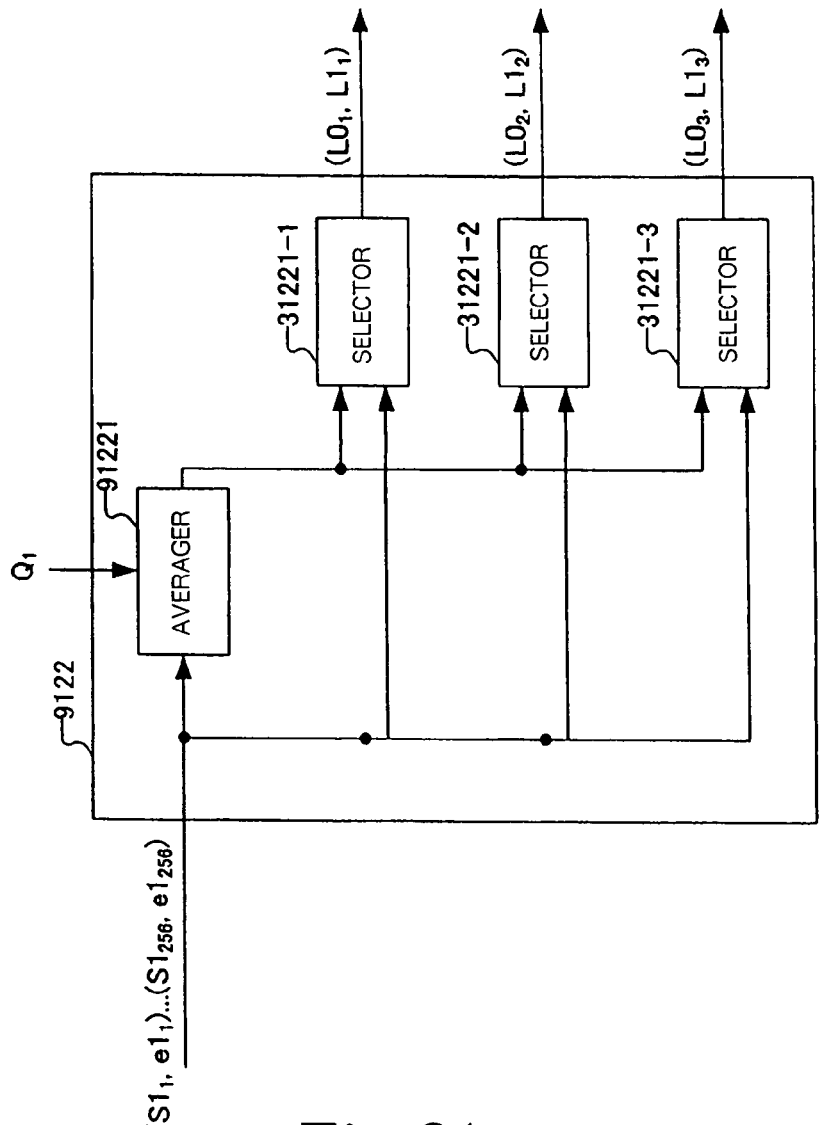
FIG. 20 is a block diagram of a bit likelihood calculator according to a fifth embodiment of the present invention.

According to the fifth embodiment, bit likelihood calculator 3122 shown in FIG. 5 is replaced with bit likelihood calculator 9122 shown in FIG. 20. Stated otherwise, the receiving apparatus according to the fifth embodiment differs from the receiving apparatus according to the first embodiment only as regards bit likelihood calculator 9122. Details of converter 732 will be described below.

Details of bit likelihood calculator 9122 will be described below.

FIG. 20 shows bit likelihood calculator 9122 in block form. As shown in FIG. 20, bit likelihood calculator 9122 comprises averager 91221 and selectors 3221-1, 3221-2, 3221-3.

Averager 91221 is supplied with symbol candidate and likelihood pairs $(S_1, e_1) \ldots (S_{256}, e_{256})$ and bit likelihood information $Q_1$.

Only when both likelihoods for bit 0 and likelihood for bit 1 can be selected from symbol candidate and likelihood pairs, averager 91221 can have smaller likelihoods to be averaged, and sequentially averages them using bit likelihood information $Q_1$ as an initial value, and outputs an average value p.

Each of selectors 3221-1, 3221-2, 3221-3 is supplied with symbol candidate and likelihood pairs $(S_1, e_1) \ldots (S_{256}, e_{256})$ and average value p. If likelihoods for either bit 0 or bit 1 can be selected from symbol candidate and likelihood pairs, then each of selectors 3221-1, 3221-2, 3221-3 selects a maximum value of the symbol likelihoods as a bit likelihood. If likelihoods for either bit 0 or bit 1 can be selected from symbol candidate and likelihood pairs, then each of selectors 3221-1, 3221-2, 3221-3 selects average value p instead as the bit likelihood.

Figure 1:
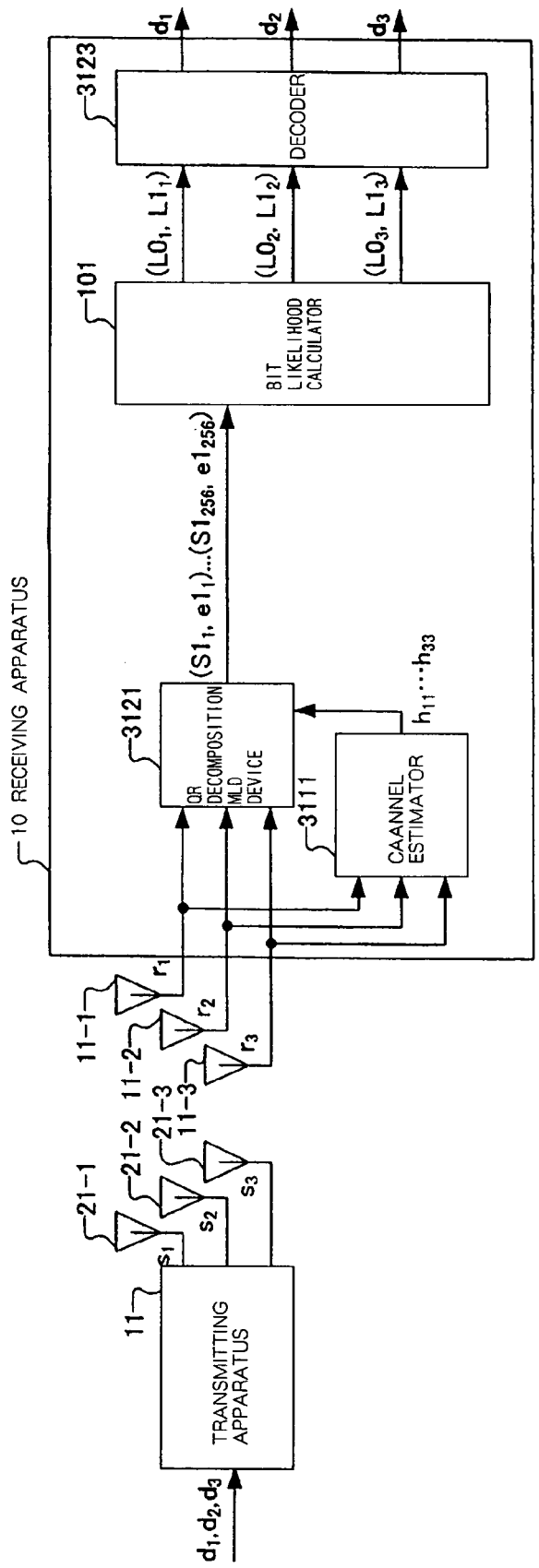
FIG. 1 is a block diagram of a conventional wireless communication system.
Figure 2:
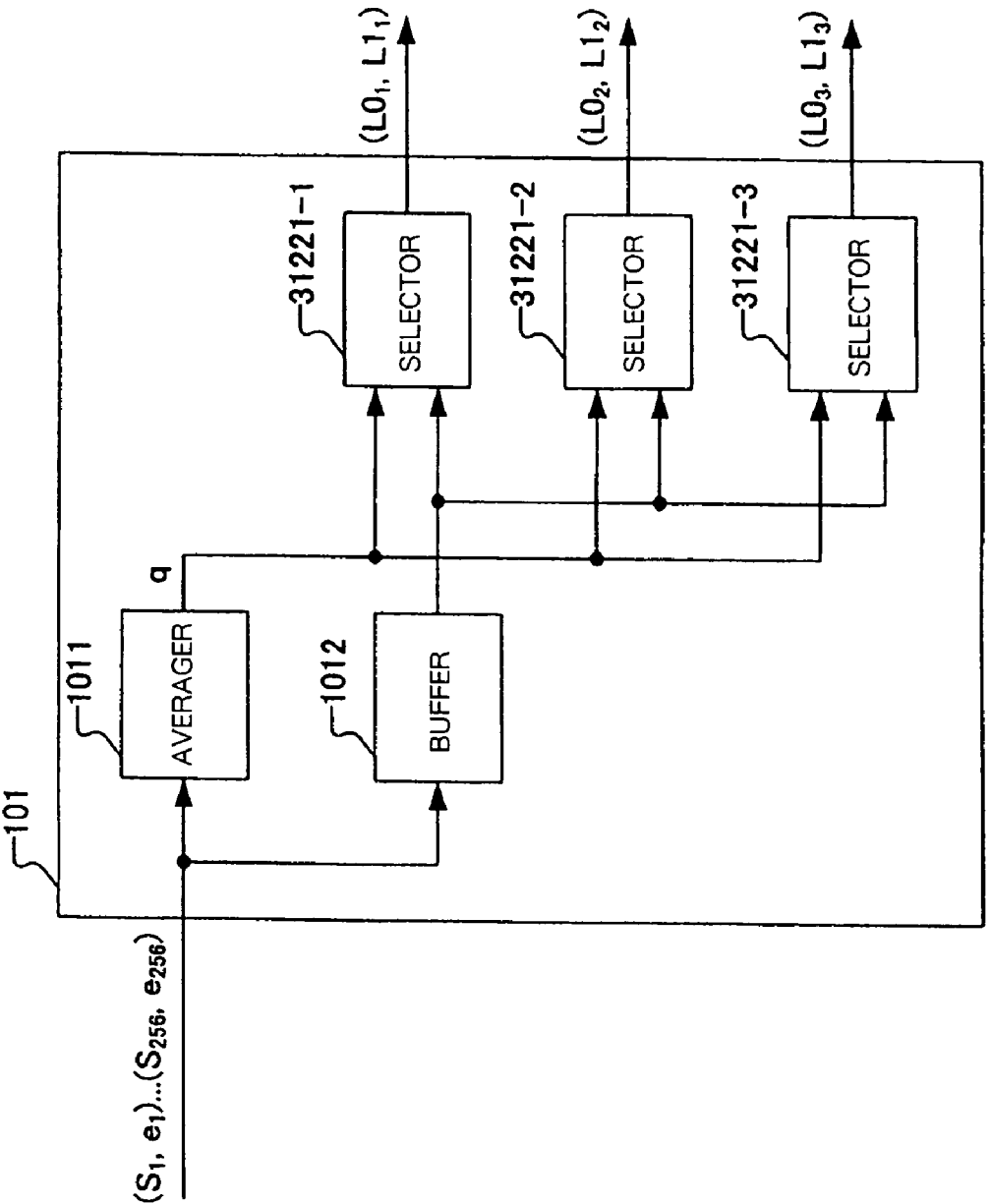
FIG. 2 is a block diagram of a bit likelihood calculator of the conventional wireless communication system shown in FIG. 1.

Since averager 91221 sequentially averages the smaller likelihoods using bit likelihood information $Q_1$ as an initial value, no buffer is required in the converter, thereby eliminating the delay caused by the conventional bit likelihood calculator shown in FIG. 2.

In addition, the second embodiment is also advantageous in that the sequentially averaged value approaches, over, the average value calculated by the conventional bit likelihood calculator shown in FIG. 2.

While preferred embodiments of the present invention have been described using specific terms, such description is for illustrative purposes only, and it is to be understood that changes and variations may be made without departing from the spirit or scope of the following claims.

What is claimed is:

1. A wireless communication system comprising:

a transmitting apparatus having M antennas (M is an integer of 2 or greater) each for transmitting K types (K is an integer of 2 or greater) of signals composed of, at most, M spatially multiplexed signals; and a receiving apparatus having N antennas (N is an integer of 2 or greater) for receiving signals transmitted from said transmitting apparatus;

said receiving apparatus comprising:

a data reproducer for being supplied with a received signal received by said N antennas and bit likelihood information, detecting a feature of a signal which is spatially multiplexed on a kth signal (k is an integer of 2 or greater) to switch between a first reception mode and a second reception mode, operating in said first reception mode directly calculating likelihoods where each bit is 1 and likelihoods where each bit is 0 from said received signals as first bit likelihood pairs and outputting a reproduced bit string and said first bit likelihood pairs, and operating in said second reception mode for, in a first case in which likelihoods where each bit is 1 and likelihoods where each bit is 0 can be directly calculated from said received signals, directly calculating likelihoods where each bit is 1 and likelihoods where each bit is 0, and for, in a second case in which likelihoods where each bit is 1 and likelihoods where each bit is 0 cannot directly be calculated from said received signals, calculating likelihoods from said bit likelihood information as second likelihood pairs, performing soft decision decoding on said second likelihood pairs, and outputting a reproduced bit string; and a likelihood information calculator for being supplied with said received signals and said first bit likelihood pairs, calculating a physical quantity with respect to smaller bit likelihoods of said first likelihood pairs, and outputting the calculated physical quantity as said bit likelihood information.

2. The wireless communication system according to claim 1, wherein said data reproducer receives the signals in said second reception mode if the product of modulation multi-valued numbers of the signal which is spatially multiplexed on the kth signal is greater than a predetermined value $P_1$ ($P_1$ is $2^M$ or greater), and said data reproducer receives the signals in said first reception mode otherwise.

3. The wireless communication system according to claim 1, wherein said likelihood information calculator averages only the smaller bits likelihoods of said first likelihood pairs, and converts an average value into said bit likelihood information using at least one of a transmission parameter of the transmitted signals and a parameter of propagation paths between the antennas.

4. The wireless communication system according to claim 3, wherein said likelihood information calculator uses a layout of constellation points as said transmission parameter.

5. The wireless communication system according to claim 3, wherein if the average squared distance between minimum signal points of the kth signal transmitted from an mth antenna is represented by $d2_{k,m,min}$ and if $K_1$ types of signals ($K_1$ is 1 or greater and less than K) are received in the first reception mode and ($K-K_1$) types of signals are received in the second reception mode, then said likelihood information calculator generates said bit likelihood information Q as:

$$Q = q \frac{\sum_{k=1}^{K-K_1} \sum_{m=1}^{M} d_{k,m,min}^2}{\sum_{k=1}^{K_1} \sum_{m=1}^{M} d_{k,m,min}^2}$$

where q represents an average value of smaller bits of the first bit likelihood pairs.

6. The wireless communication system according to claim 3, wherein if the average squared distance between minimum signal points of the kth signal transmitted from an mth antenna is represented by $d2_{k,m,min}$ and if $K_1$ types of signals ($K_1$ is 1 or greater and less than K) are received in the first reception mode and ($K-K_1$) types of signals are received in the second reception mode, then said likelihood information calculator generates said bit likelihood information Q as:

$$Q = q \frac{1}{\sum_{n=1}^{N} \left|\sum_{m=1}^{M} hnm\right|^2 \cdot \sum_{m=1}^{M} \frac{1}{\sum_{n=1}^{N} h_{nm}^2}} \cdot \frac{\sum_{k=1}^{K-K_1} \sum_{m=1}^{M} d_{k,m,min}^2}{\sum_{k=1}^{K_1} \sum_{m=1}^{M} d_{k,m,min}^2}$$

where $h_{nm}$ represents the propagation path between an nth reception antenna and the mth transmission antenna, and q an average value of smaller bits of the first bit likelihood pairs.

7. A receiving apparatus having N antennas (N is an integer of 2 or greater) for receiving signals transmitted from a transmitting apparatus having M antennas (M is an integer of 2 or greater) each for transmitting K types (K is an integer of 2 or greater) of signals composed of, at most, M spatially multiplexed signals, said receiving apparatus comprising:

data reproducing means for being supplied with a received signal received by said N antennas and with bit likelihood information, detecting a feature of a signal which is spatially multiplexed on a kth signal (k is an integer of 2 or greater) to switch between a first reception mode and a second reception mode, operating in said first reception mode directly calculating likelihoods where each bit is 1 and likelihoods where each bit is 0 from said received signals as first bit likelihood pairs and outputting a reproduced bit string and said first bit, likelihood pairs, and operating in said second reception mode for, in a first case in which likelihoods where each bit is 1 and likelihoods where each bit is 0 can directly be calculated from said received signals, directly calculating likelihoods where each bit is 1 and likelihoods where each bit is 0, and for, in a first case in which likelihoods where each bit is 1 and likelihoods where each bit is 0 cannot be directly calculated from said received signals, calculating likelihoods from said bit likelihood information as second likelihood pairs, performing soft decision decoding on said second likelihood pairs, and outputting a reproduced bit string; and likelihood information calculating means for being supplied with said received signals and said first bit likelihood pairs, calculating a physical quantity with respect to smaller bit likelihoods of said first likelihood pairs, and outputting the calculated physical quantity as said bit likelihood information.

8. The receiving apparatus according to claim 7, wherein said data reproducing means receives the signals in said second reception mode if the product of modulation multi-valued numbers of the signal which is spatially multiplexed on the kth signal is greater than a predetermined value $P_1$ ($P_1$ is $2^M$ or greater), and said data reproducing means receives the signals in said first reception mode otherwise.

9. The receiving apparatus according to claim 7, wherein said likelihood information calculating means averages only the smaller bit likelihoods of said first likelihood pairs, and converts an average value into said bit likelihood information using at least one transmission parameter of the transmitted signals and one parameter of the propagation paths between the antennas.

10. The receiving apparatus according to claim 9, wherein said likelihood information calculating means uses a layout of constellation points as said transmission parameter.

11. The receiving apparatus according to claim 9, wherein if the average squared distance between minimum signal points of the kth signal transmitted from an mth antenna is represented by $d2_{k,m,min}$ and if $K_1$ types of signals ($K_1$ is 1 or greater and less than K) are received in the first reception mode and ($K-K_1$) types of signals are received in the second reception mode, then said likelihood information calculating means generates said bit likelihood information Q as:

$$Q = q \frac{\sum_{k=1}^{K-K_1} \sum_{m=1}^{M} d_{k,m,min}^2}{\sum_{k=1}^{K_1} \sum_{m=1}^{M} d_{k,m,min}^2}$$

where q represents an average value of smaller bits of the first bit likelihood pairs.

12. The receiving apparatus according to claim 9, wherein if the average squared distance between minimum signal points of the kth signal transmitted from an mth antenna is represented by $d2_{k,m,min}$ and if $K_1$ types of signals ($K_1$ is 1 or greater and less than K) are received in the first reception mode and ($K-K_1$) types of signals are received in the second reception mode, then said likelihood information calculating means generates said bit likelihood information Q as:

$$Q = q \frac{1}{\sum_{n=1}^{N} \left|\sum_{m=1}^{M} hnm\right|^2 \cdot \sum_{m=1}^{M} \frac{1}{\sum_{n=1}^{N} h_{nm}^2}} \cdot \frac{\sum_{k=1}^{K-K_1} \sum_{m=1}^{M} d_{k,m,min}^2}{\sum_{k=1}^{K_1} \sum_{m=1}^{M} d_{k,m,min}^2}$$

where $h_{nm}$ represents the propagation path between an nth reception antenna and the mth transmission antenna, and q an average value of smaller bits of the first bit likelihood pairs.

13. The method of demodulating signals in a receiving apparatus having N antennas (N is an integer of 2 or greater) for receiving signals transmitted from a transmitting apparatus having M antennas (M is an integer of 2 or greater) each for transmitting K types (K is an integer of 2 or greater) of signals composed of, at most, M spatially multiplexed signals, said method comprising the steps of:

being supplied with a received signal received by said N antennas and with bit likelihood information, detecting a feature of a signal which is spatially multiplexed on a kth signal (k is an integer of 2 or greater) to switch between a first reception mode and a second reception mode, operating in said first reception mode for directly calculating likelihoods where each bit is 1 and likelihoods where each bit is 0 from said received signals as first bit likelihood pairs and outputting a reproduced bit string and said first bit likelihood pairs, and operating in said second reception mode for, in a first case in which likelihoods where each bit is 1 and likelihoods where each bit is 0 can directly be calculated from said received signals, directly calculating likelihoods where each bit is 1 and likelihoods where each bit is 0, and for, in a second case in which likelihoods where each bit is 1 and likelihoods where each bit is 0 cannot be directly calculated from said received signals, calculating likelihoods from said bit likelihood information as second likelihood pairs, performing soft decision decoding on said second likelihood pairs, and outputting a reproduced bit string; and being supplied with said received signals and said first bit likelihood pairs, calculating a physical quantity with respect to smaller bit likelihoods of said first likelihood pairs, and outputting the calculated physical quantity as said bit likelihood information.

14. The method according to claim 13, wherein the signals are received in said second reception mode if the product of modulation multi-valued numbers of the signal which is spatially multiplexed on the kth signal is greater than a predetermined value $P_1$ ($P_1$ is $2^M$ or greater), and the signals are received in said first reception mode otherwise.

15. The method according to claim 13, wherein only the smaller bits likelihoods of said first likelihood pairs are averaged, and an average value is converted into said bit likelihood information using at least one transmission parameter of the transmitted signals and one parameter of the propagation paths between the antennas.

16. The method according to claim 15, wherein a layout of constellation points is used as said transmission parameter.

17. The method according to claim 15, wherein if the average squared distance between minimum signal points of the kth signal transmitted from an mth antenna is represented by $d2_{k,m,min}$ and if $K_1$ types of signals ($K_1$ is 1 or greater and less than K) are received in the first reception mode and ($K-K_1$) types of signals are received in the second reception mode, then said bit likelihood information Q is generated as:

$$Q = q \frac{\sum_{k=1}^{K-K_1} \sum_{m=1}^{M} d^2_{k,m,min}}{\sum_{k=1}^{K_1} \sum_{m=1}^{M} d^2_{k,m,min}}$$

where q represents an average value of smaller bits of the first bit likelihood pairs.

18. The method according to claim 15, wherein if the average squared distance between minimum signal points of the kth signal transmitted from an mth antenna is represented by $d2_{k,m,min}$ and if $K_1$ types of signals ($K_1$ is 1 or greater and less than K) are received in the first reception mode and ($K-K_1$) types of signals are received in the second reception mode, then said bit likelihood information Q is generated as:

$$Q = q \frac{1}{\sum_{n=1}^{N} \left| \sum_{m=1}^{M} hnm \right|^2 \cdot \sum_{m=1}^{M} \frac{1}{\sum_{n=1}^{N} h^2_{nm}}} \cdot \frac{\sum_{k=1}^{K-K_1} \sum_{m=1}^{M} d^2_{k,m,min}}{\sum_{k=1}^{K_1} \sum_{m=1}^{M} d^2_{k,m,min}}$$

where $h_{nm}$ represents the propagation path between an nth reception antenna and the mth transmission antenna, and q an average value of smaller bits of the first bit likelihood pairs.

19. The program for controlling a computer to carry out a method of demodulating signals in a receiving apparatus having N antennas (N is an integer of 2 or greater) for receiving signals transmitted from a transmitting apparatus having M antennas (M is an integer of 2 or greater) each for transmitting K types (K is an integer of 2 or greater) of signals composed of, at most, M spatially multiplexed signals, said program comprising the steps of:

being supplied with a received signal received by said N antennas and with bit likelihood information, detecting a feature of a signal which is spatially multiplexed on a kth signal (k is an integer of 2 or greater) to switch between a first reception mode and a second reception mode, operating in said first reception mode for directly calculating likelihoods where each bit is 1 and likelihoods where each bit is 0 from said received signals as first bit likelihood pairs and outputting a reproduced bit string and said first bit likelihood pairs, and operating in said second reception mode for, in a first case in which likelihoods where each bit is 1 and likelihoods where each bit is 0 can be directly calculated from said received signals, directly calculating likelihoods where each bit is 1 and likelihoods where each bit is 0, and for, in a second case in which likelihoods where each bit is 1 and likelihoods where each bit is 0 cannot directly be calculated from said received signals, calculating likelihoods from said bit likelihood information as second likelihood pairs, performing soft decision decoding on said second likelihood pairs, and outputting a reproduced bit string; and being supplied with said received signals and said first bit likelihood pairs, calculating a physical quantity with respect to smaller bit likelihoods of said first likelihood pairs, and outputting the calculated physical quantity as said bit likelihood information.

20. The program according to claim 19, wherein the signals are received in said second reception mode if the product of modulation multi-valued numbers of the signal which is spatially multiplexed on the kth signal is greater than a predetermined value $P_1$ ($P_1$ is $2^M$ or greater), and the signals are received in said first reception mode otherwise.

* * * * *